(12) United States Patent
Oda

(10) Patent No.: US 12,313,446 B2
(45) Date of Patent: May 27, 2025

(54) WINDSHIELD FOR DEFINING A WEIGHING CHAMBER OF A BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 403 days.

(21) Appl. No.: 17/909,750

(22) PCT Filed: Mar. 17, 2020

(86) PCT No.: PCT/JP2020/011748
§ 371 (c)(1),
(2) Date: Sep. 6, 2022

(87) PCT Pub. No.: WO2021/186559
PCT Pub. Date: Sep. 23, 2021

(65) Prior Publication Data
US 2023/0113500 A1    Apr. 13, 2023

(51) Int. Cl.
| G01G 21/28 | (2006.01) |
| E05F 15/75 | (2015.01) |
| F15B 15/28 | (2006.01) |
| G01G 21/30 | (2006.01) |

(52) U.S. Cl.
CPC ........... G01G 21/286 (2013.01); E05F 15/75 (2015.01); G01G 21/30 (2013.01); *F15B 15/28* (2013.01)

(58) Field of Classification Search
CPC ...... F15B 15/28; G01G 21/28; G01G 21/286; G01G 21/213; G01G 21/30; E05F 15/47; E05F 15/75; E05F 2015/765

USPC .................................................. 177/180, 181
See application file for complete search history.

(56) References Cited

U.S. PATENT DOCUMENTS

| 3,691,902 | A | * | 9/1972 | Lebzelter | .............. F15B 15/223 91/394 |
| 4,789,034 | A | | 12/1988 | Luechinger et al. | |
| 6,246,018 | B1 | | 6/2001 | Schink | |
| 10,533,586 | B2 | * | 1/2020 | Fujiwara | ................. F15B 15/14 |
| 10,634,172 | B2 | * | 4/2020 | Fujiwara | ............... F15B 19/005 |
| 11,072,965 | B2 | * | 7/2021 | Soderqvist | .............. E05F 15/72 |

(Continued)

FOREIGN PATENT DOCUMENTS

| CN | 102152164 A | 8/2011 |
| DE | 3924236 | 2/1990 |

(Continued)

Primary Examiner — Randy W Gibson
(74) Attorney, Agent, or Firm — Studebaker Brackett PLLC

(57) ABSTRACT

A windshield for a balance is provided, and the windshield to be attached to a balance to define a weighing chamber, includes openable and closable doors constituting portions of the weighing chamber, opening and closing mechanisms configured to open and close the doors, sensors configured to detect movement of the doors, and a control unit configured to command the opening and closing mechanism to open and close the door when a movement of the door from a stationary state is detected by the sensors. When an operator slightly moves the door from a stationary state to open or close the door, the sensor detects this, and the door is automatically opened or closed.

13 Claims, 21 Drawing Sheets

| | Automatic opening operation (door moves rearward) | Automatic closing operation (door moves forward) | Standard state (door is manually openable and closable) | Assist mode is valid (standby state) |
|---|---|---|---|---|
| First one-way solenoid valve 66A | Open | Close | Open | Close |
| First pressurization pump 62A | Not operate | Pressurize | Not operate | Not operate |
| Second one-way solenoid valve 66B | Close | Open | Open | Close |
| Second pressurization pump 62B | Pressurize | Not operate | Not operate | Not operate |

When assist mode is valid
 First pressure senor 64A detects pressure increase ⇒ Automatic opening operation
 Second pressure senor 64B detects pressure increase ⇒ Automatic closing operation
After automatic opening operation/automatic closing operation, enters standard state once, then returns to assist mode-valid

(56) References Cited

U.S. PATENT DOCUMENTS

| | | |
|---|---|---|
| 2010/0288660 A1 | 11/2010 | Luchinger et al. |
| 2011/0132669 A1* | 6/2011 | Laubstein ............ G01G 21/286 |
| | | 177/181 |
| 2015/0204716 A1 | 7/2015 | Lewandowski et al. |
| 2018/0106665 A1 | 4/2018 | Feldotte et al. |
| 2021/0156730 A1* | 5/2021 | Oda ....................... G01G 21/22 |

FOREIGN PATENT DOCUMENTS

| | | |
|---|---|---|
| EP | 0216035 | 4/1987 |
| JP | 61-212731 A | 9/1986 |
| JP | 2003-262549 A | 9/2003 |
| NO | 2014038969 | 3/2014 |

* cited by examiner

Fig. 8

| | Automatic opening operation (door moves rearward) | Automatic closing operation (door moves forward) | Standard state (door is manually openable and closable) | Assist mode is valid (standby state) |
|---|---|---|---|---|
| First one-way solenoid valve 66A | Open | Close | Open | Close |
| First pressurization pump 62A | Not operate | Pressurize | Not operate | Not operate |
| Second one-way solenoid valve 66B | Close | Open | Open | Close |
| Second pressurization pump 62B | Pressurize | Not operate | Not operate | Not operate |

When assist mode is valid
    First pressure senor 64A detects pressure increase ⇒ Automatic opening operation
    Second pressure senor 64B detects pressure increase ⇒ Automatic closing operation
    After automatic opening operation/automatic closing operation, enters standard state once, then returns to assist mode-valid Fig. 15A  Door fully closed position
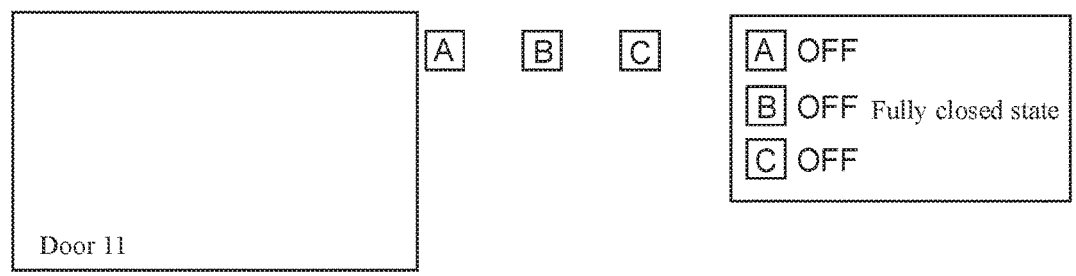
Fig. 15B  Door half-open position
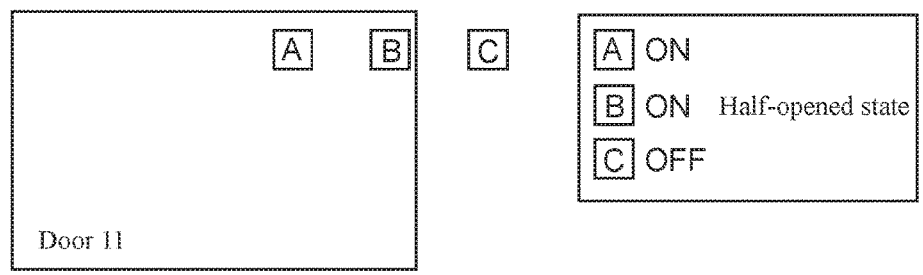
Fig. 15C  Door fully opened position
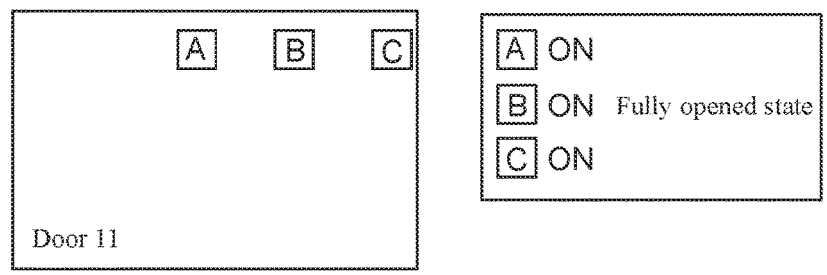

Fig. 16A  Door fully closed position
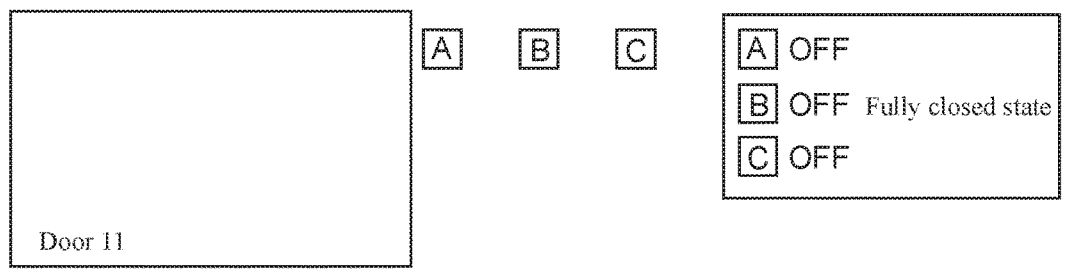
Fig. 16B  Door starting to move
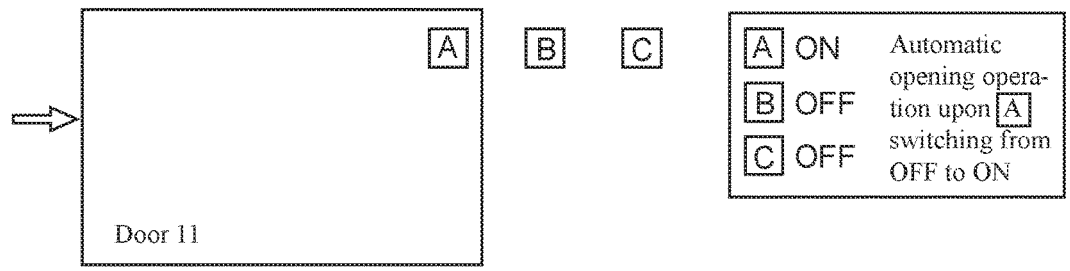
Fig. 16C  Door fully opened position
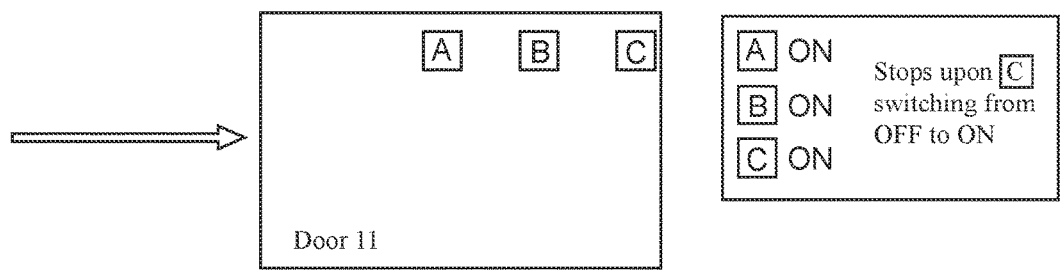

Fig. 17A Door fully opened position
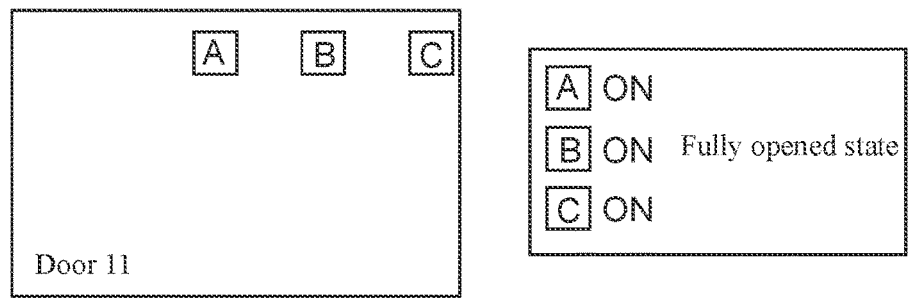
Fig. 17B Door starting to move
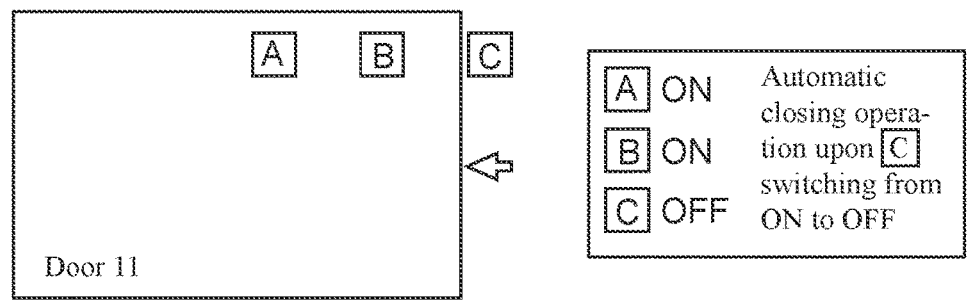
Fig. 17C Door fully closed position
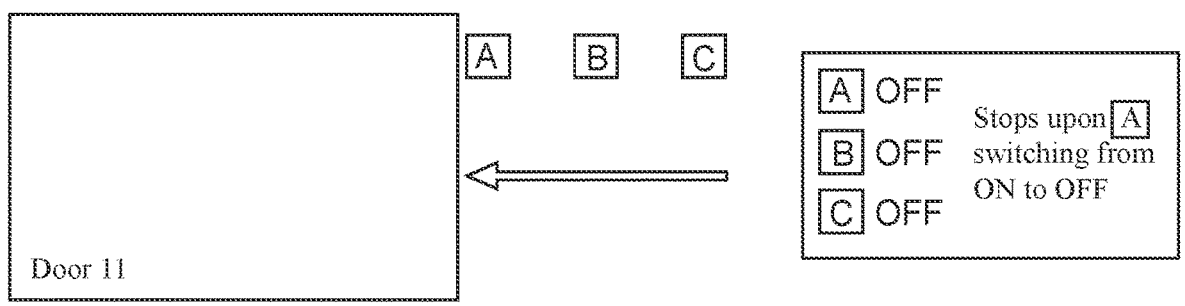

Fig. 18A    Door fully closed position
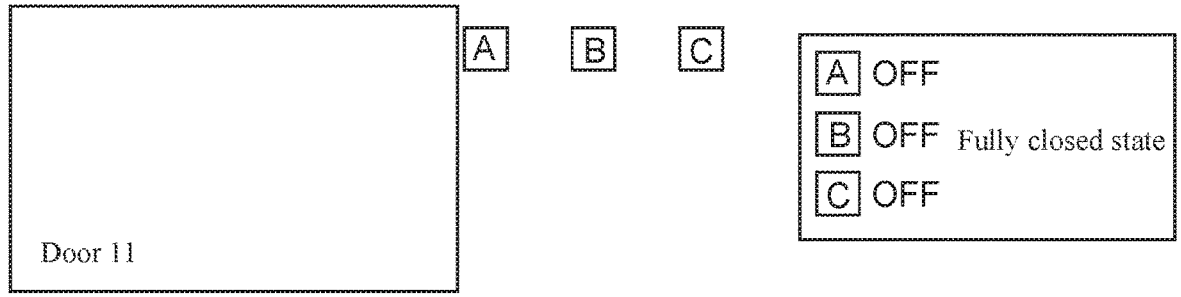
Fig. 18B    Door starting to move
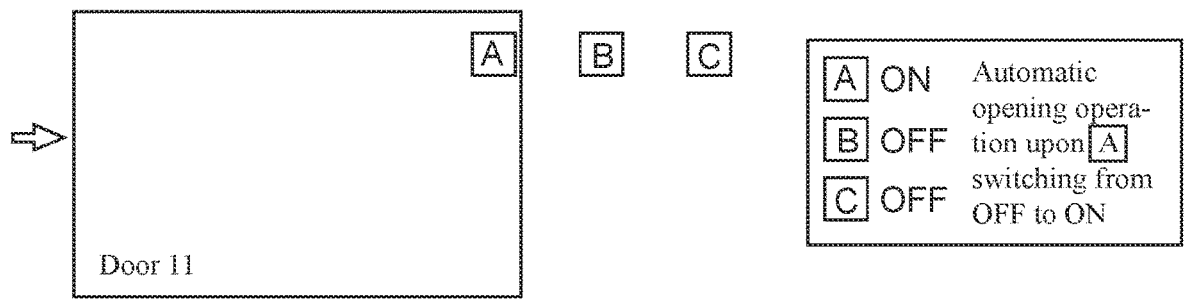
Fig. 18C    Door half-open position
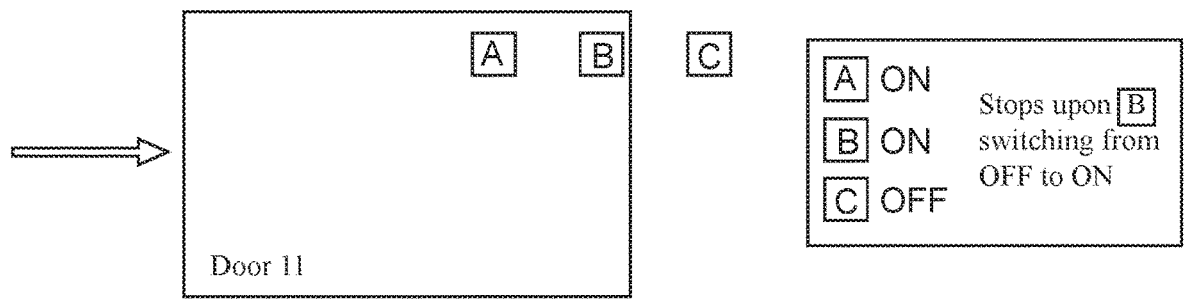

Fig. 19A  Door half-open position
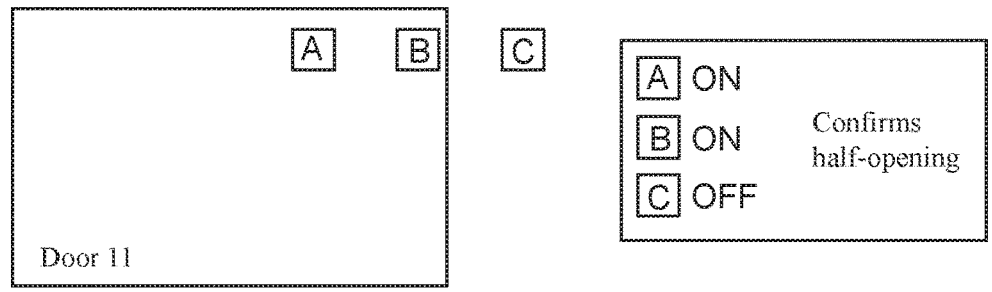
Fig. 19B  Door starting to move
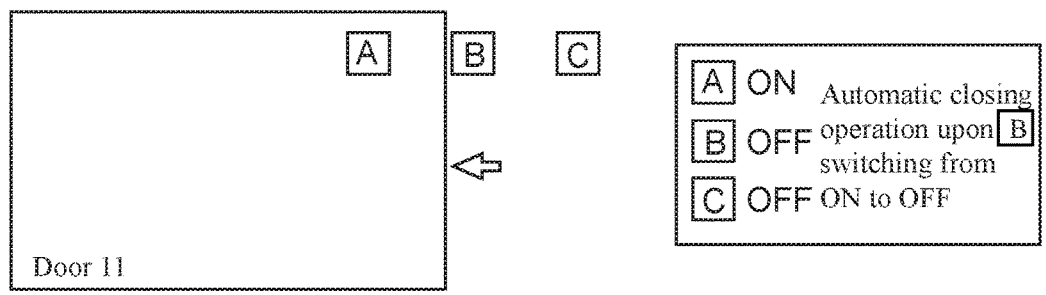
Fig. 19C  Door fully closed position
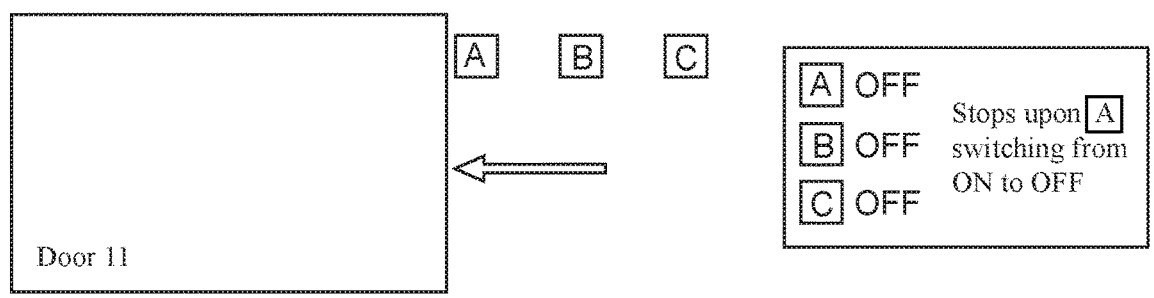

Fig. 20

| | Automatic opening operation (door moves rearward) | Automatic closing operation (door moves forward) | Standard state (door is manually openable and closable) | Assist mode is valid (standby state) |
|---|---|---|---|---|
| First one-way solenoid valve 66A | Open | Close | Open | Open |
| First pressurization pump 62A | Not operate | Pressurize | Not operate | Not operate |
| Second one-way solenoid valve 66B | Close | Open | Open | Open |
| Second pressurization pump 62B | Pressurize | Not operate | Not operate | Not operate |

When assist mode is valid
Position sensor 7A switches from OFF to ON ⇒ Automatic opening operation
(Half-opening function is valid) Position sensor 7C switches from ON to OFF ⇒ Automatic closing operation
(Half-opening function is invalid) Position sensor 7B switches from ON to OFF ⇒ Automatic closing operation
After automatic opening operation/automatic closing operation, returns to assist mode-valid

WINDSHIELD FOR DEFINING A WEIGHING CHAMBER OF A BALANCE

TECHNICAL FIELD

The present invention relates to a windshield for a balance, having a door to be automatically opened and closed.

BACKGROUND ART

There is a windshield having a door to be automatically opened and closed by a switch. For example, in Patent Literature 1, a light sensor is used as the switch.

CITATION LIST

Patent Literature

[Patent Literature 1] Japanese Published Unexamined Patent Application No. 2003-262549

SUMMARY OF INVENTION

Technical Problem

However, a non-contact switch such as a light sensor is unexpectedly activated in some cases. On the other hand, in a case of using a push switch, the switch needs to be pushed with a fingertip or the like, and it is difficult to push the switch while holding a specimen by hand. In addition, in a case of manual opening and closing, it is troublesome to move the door to a desired position.

The present invention was made in view of these problems, and an object thereof is to provide a windshield for a balance, having an opening and closing mode that is convenient for use.

Solution to Problem

In order to solve the problems described above, according to an aspect of the present disclosure, a windshield to be attached to a balance to define a weighing chamber, is configured to include an openable and closable door constituting a portion of the weighing chamber, an opening and closing mechanism configured to open and close the door, a sensor configured to detect movement of the door, and a control unit configured to perform control so as to cause the opening and closing mechanism to open or close the door when a movement of the door from a stationary state is detected by the sensor.

According to this aspect, the movement of the door from a stationary state is a slight movement of the door by an operator, and when an operator slightly moves the door to open or close it, this movement is detected and the door is automatically opened or closed. A switch such as a light sensor is not used, and the movement of the door from a stationary state serves as a switch, so that erroneous activation of unexpected opening/closing can be suppressed. Even while an operator holds a specimen by hand, just by slightly pushing the door, the door is automatically opened or closed, so that the specimen can be continuously placed into the weighing chamber. The door does not have to be moved to a desired position, and a door opening/closing operation is assisted just by slightly moving the door by the back of the hand. An assist mode which is in between an automatic opening and closing mode and a manual opening and closing mode of the door is entered, and this is convenient for use.

Moreover, in an aspect, the sensor is configured to detect a moving direction of the door, and the control unit is configured to perform control so as to cause the opening and closing mechanism to open the door when the door is moved in an opening direction, and perform control so as to cause the opening and closing mechanism to close the door when the door is moved in a closing direction. According to this aspect, an opening/closing movement of the door by an operator is assisted as it is. Erroneous activation in which the door moves in an operator's unexpected direction is also unlikely to occur, and this is convenient for use.

Moreover, in an aspect, the opening and closing mechanism is configured to include, as a drive source to drive the door, an air cylinder to be joined to the door, and the sensor is a pressure sensor configured to measure an air pressure of the air cylinder, so that the movement of the door is detected based on a change in the air pressure measured by the pressure sensor. The pressure sensor that monitors an air pressure of the air cylinder is also used as a sensor to detect a movement of the door, so that without adding a special mechanism, movements of the door can be monitored.

Moreover, in an aspect, the sensor is configured to be light sensors to be disposed respectively at an open position and a closed position of the door. A position of the door is checked by the light sensor, so that a movement of the door can be detected without depending on a driving means.

Moreover, in an aspect, the windshield is configured to include a mechanism configured to stop the door at a half-open position, and so that a movement of the door is configured to be switchable to full-opening/closing or half-opening/closing. The door can also be automatically half-opened, and an opening degree can be selected according to an operator's wish, and this is convenient for use.

Advantageous Effects of Invention

With the configurations described above, a windshield for a balance, having an opening and closing mode that is convenient for use, can be provided.

BRIEF DESCRIPTION OF DRAWINGS

FIG. 8 is an operation chart of the opening and closing mechanism of the door according to the first embodiment.

FIGS. 15A, 15B, and 15C are is explanatory views of disposition locations of position sensors.

FIGS. 16A, 16B, and 16C are explanatory views describing behaviors of the door and the position sensors (full-closing⇒full-opening).

FIGS. 17A, 17B, and 17C are explanatory views describing behaviors of the door and the position sensors (full-opening⇒full-closing).

FIGS. 18A, 18B, and 18C are explanatory views describing behaviors of the door and the position sensors (full-closing⇒half-opening).

FIGS. 19A, 19B, and 19C are explanatory views describing behaviors of the door and the position sensors (half-opening⇒full-closing).

FIG. 20 is an operation chart of an opening and closing mechanism of the door according to the second embodiment.

DESCRIPTION OF EMBODIMENTS (Configuration of Electronic Balance)

Figure 1:
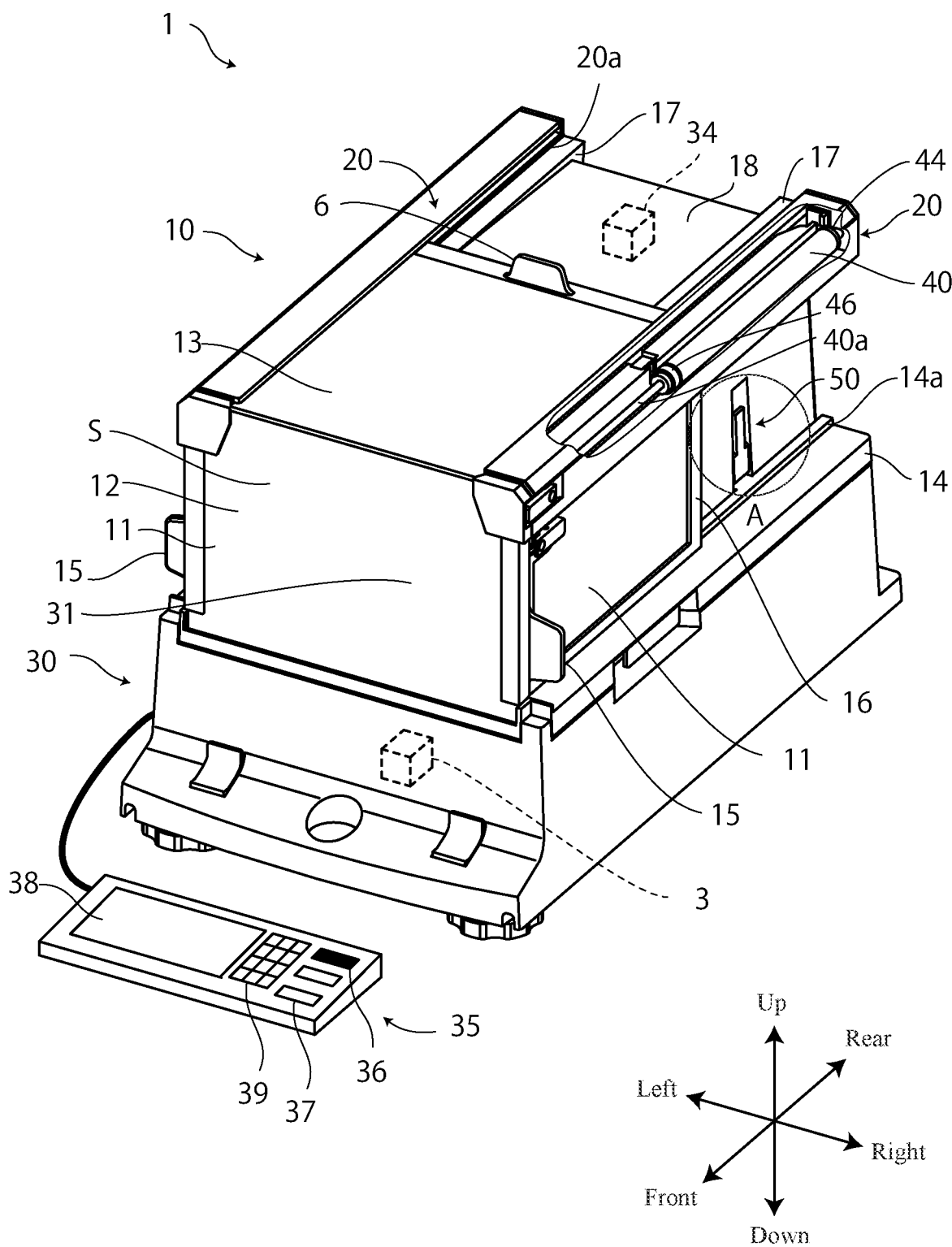
FIG. 1 is a partially broken-away perspective view of an electronic balance including a windshield according to a first embodiment.

Hereinafter, preferred embodiments according to a configuration of the present disclosure will be described with reference to the drawings. FIG. 1 is a partially broken-away perspective view of an electronic balance 1 including a windshield 10 for a balance according to a first embodiment.

As illustrated in FIG. 1, the electronic balance 1 includes a balance main body 30 and the windshield 10. The balance main body 30 includes a weighing pan 31 for placing a specimen on its upper surface. A weighing mechanism 3 is provided at a lower portion of the weighing pan 31, but since this uses a conventionally known configuration, description thereof is omitted.

The windshield 10 is disposed on an upper surface of the balance main body 30 so as to enclose the surrounding of the weighing pan 31, and prevents air flow around the weighing pan 31, for example, wind from an air conditioner, breath of a person at the time of weighing, and air flow generated when a person walks, etc., from acting as a wind pressure on a load-applied portion centered on the weighing pan 31 and influencing weighing.

The windshield 10 is detachably attached to the balance main body 30, and for an attaching and detaching mechanism, a configuration conventionally known, for example, the configuration disclosed in Japanese Published Unexamined Patent Application No. 2008-216047 is used, however, without limitation to this, a configuration in which the windshield 10 and the balance main body 30 are integrated in a non-separable manner is also possible.

The windshield 10 has a bottomless box shape, and has a front glass 12 at a front surface, a box-shaped case 18 at a back portion, doors 11 at portions of left and right side walls, and an upper surface door 13 at the upper surface, and as a space defined by these, a weighing chamber S having a rectangular parallelepiped shape is formed inside. However, the windshield 10 may be configured to have a shape other than a bottomless box shape.

The doors 11 can respectively move forward and rearward along rails 14a provided on a lower frame 14 as a frame member at a lower portion of the windshield 10, and the upper surface door 13 can move forward and rearward along rails 20a provided in cylinder boxes 20 on left and right sides of an upper portion of the windshield 10.

For the front glass 12, the upper surface door 13, and the left and right doors 11, a transparent glass or resin material is used so that an internal state can be observed. To each of the upper surface door 13 and the doors 11, a handle 6, 15 that assists sliding is attached. The upper surface door 13 can be manually opened and closed, and the doors 11 at the left and right side surfaces are configured so that they can be automatically and manually opened and closed.

A control panel 35 is for operating the balance main body 30 and the windshield 10, and provided separately from the balance main body 30 and the windshield 10. Because the control panel is a separate body, a user can freely dispose the control panel at a position easy to operate. The control panel 35 is connected to the balance main body 30 by a cable, and signal transmission and reception are performed by wire, but a configuration in which a communication mechanism is provided so that signal transmission and reception are performed wirelessly is also possible. The control panel 35 may be configured not as a separate body but integrally with the balance main body 30 and the windshield 10.

The control panel 35 includes, on its upper surface, a display unit 38 to display weighing results and states, an input unit 39, a push switch 37, and an infrared switch 36. The infrared switch 36 is a non-contact sensor for opening and closing the doors 11, and just by holding a hand over the infrared switch, the doors 11 can be automatically opened and closed. The push switch 37 is also an opening and closing switch for the doors 11, and by pushing this, the doors 11 can be automatically opened and closed.

In the present embodiment, two types of opening and closing switches for the doors 11 are provided, but only one type of these may be provided, and a balance operating function other than the opening and closing function for the doors 11 may be assigned to the infrared switch 36 or the push switch 37. A configuration may be possible in which these two are provided on each of the left and the right so as to open and close corresponding doors 11.

Settings, numerical values, commands, etc., can be input by the input unit 39. For example, it is possible to bring about a state for rejecting the infrared switch 36 and perform settings for switching of opening and closing modes of the doors 11, etc.

Upper frames 17 are provided to constitute left and right upper sides of the windshield 10 having a substantially rectangular parallelepiped shape, and the cylinder boxes 20 are engaged with the upper frames 17 so that their longitudinal directions match. The cylinder box 20 is a hollow housing, and inside, an air cylinder 40 serving as a driving means to open and close the door 11 is housed.

The air cylinder 40 is a double-acting type, and both of the forward and backward strokes of reciprocating motion of a piston inside the air cylinder 40 are made by air pressure, so that ports to feed air to the inside of the air cylinder 40 are provided at two positions. A retreat-side port 46 for making the piston move rearward by fed air is provided at the front side of the air cylinder 40, and an advance-side port 44 for making the piston move forward is provided at the rear side. To the advance-side port 44 and the retreat-side port 46, air tubes not illustrated are connected, and are linked to the inside of the case 18.

Inside the case 18, pumps serving as drive sources of the air cylinder 40 and solenoid valves to control the flow and stoppage of air, a control unit 34 to control these pumps and solenoid valves, etc., are housed.

(Structure of Door)

Figure 2:
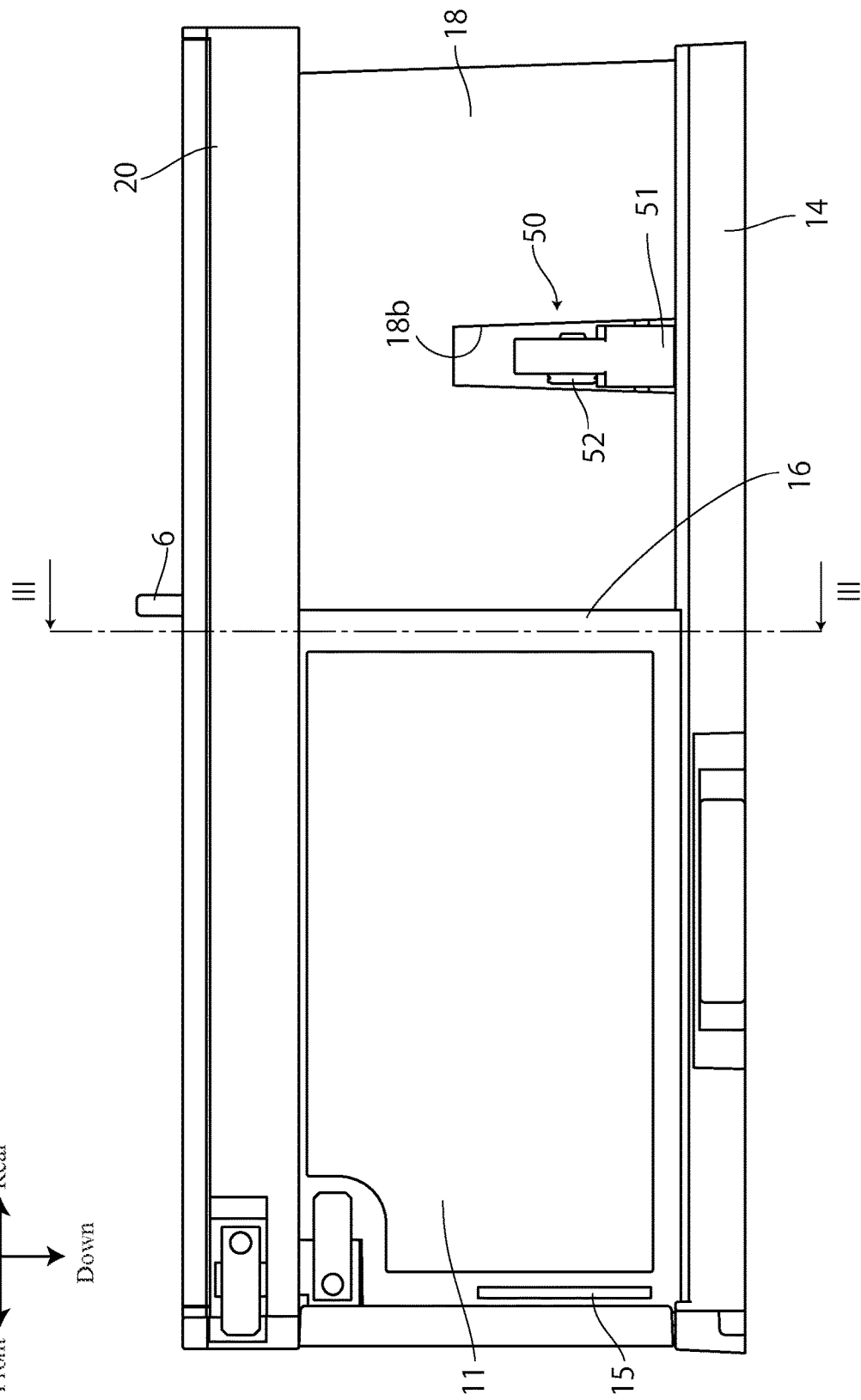
FIG. 2 is a right side view of the windshield according to the first embodiment.
Figure 3:
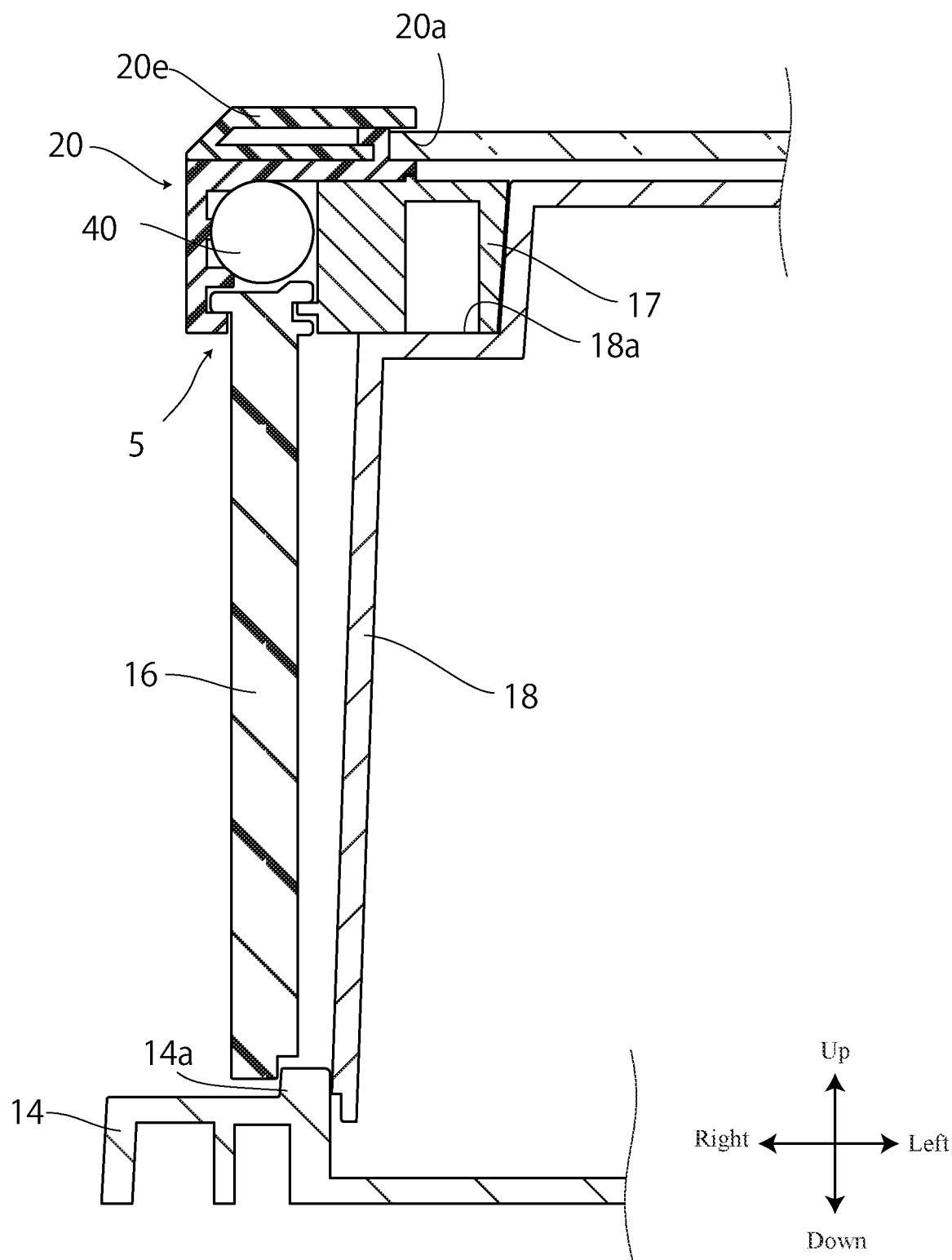
FIG. 3 is an end view taken along line III-III in FIG. 2.
Figure 4:
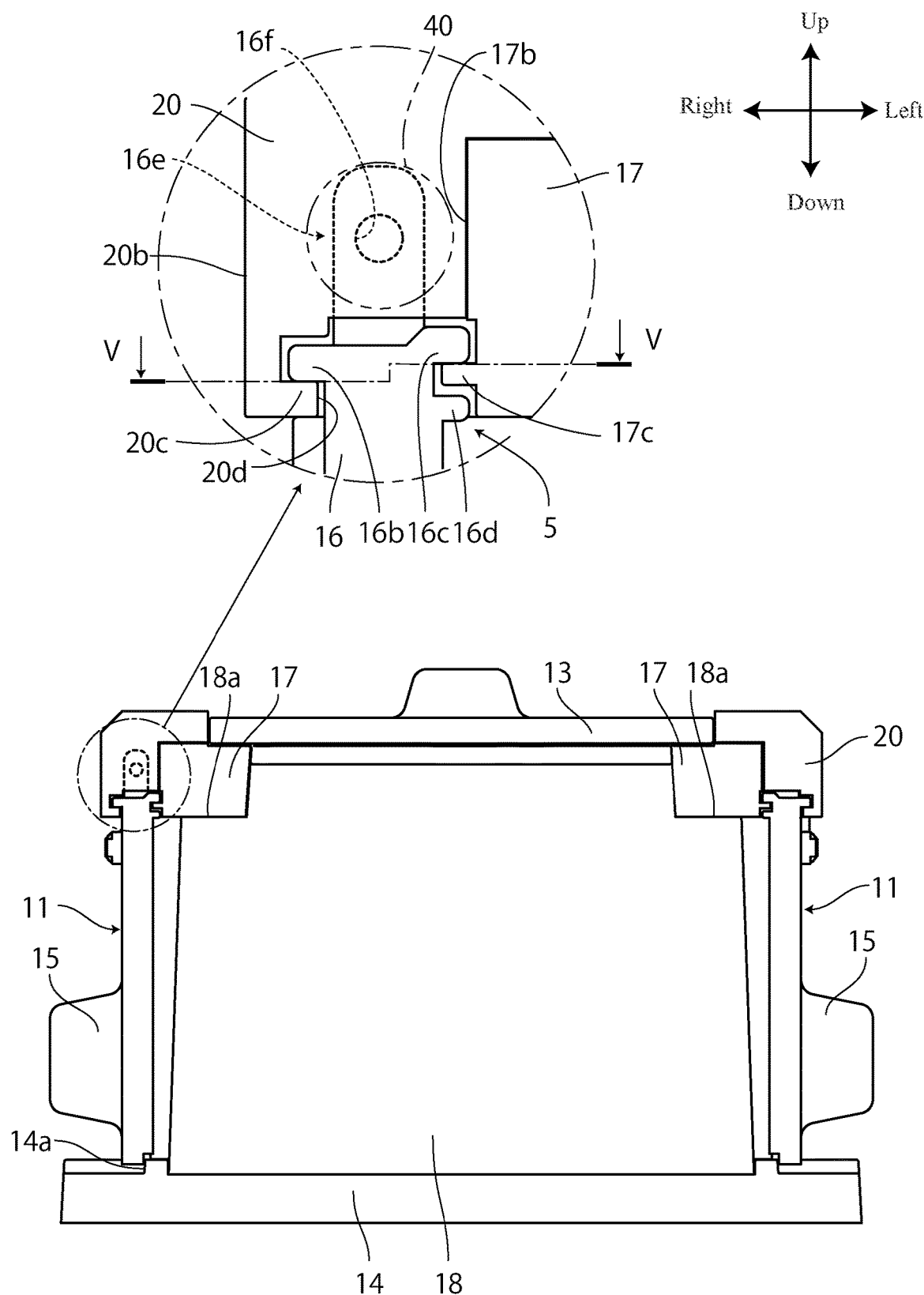
FIG. 4 is a back view of the windshield according to the first embodiment.
Figure 5:
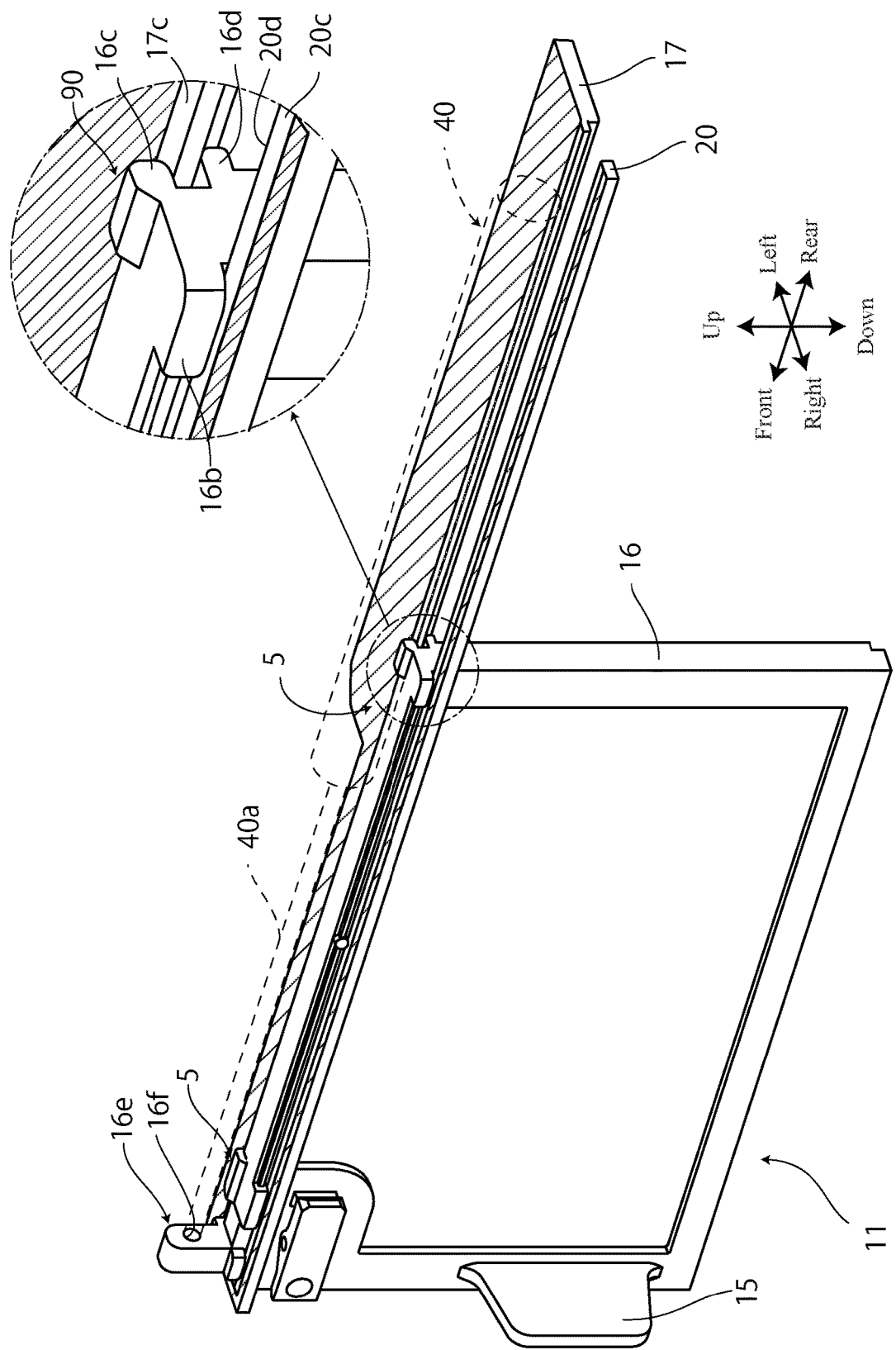
FIG. 5 is an explanatory view for describing an opening and closing mechanism of a door according to the first embodiment, and is a partial cross-sectional perspective view with a part broken away along line V-V in FIG. 4.

Next, an opening and closing mechanism of the door 11 and a structure of the mechanism will be described. FIG. 2 is a right side view of the windshield 10, and FIG. 3 is an end face view taken along line III-III in FIG. 2, and FIG. 4 is a back view of the windshield 10. FIG. 5 is an explanatory view for describing a shape and a configuration of the door 11, illustrating only the door 11, the cylinder box 20, and the upper frame 17, and is a partial cross-sectional perspective view of the cylinder box 20 and the upper frame 17 cut along line V-V in FIG. 4.

As illustrated in FIG. 3, a recess portion is formed in an inner wall of the cylinder box 20 to match the shape of the air cylinder 40, and in this recess portion, the air cylinder 40 is engaged and fixed. The cylinder box 20 includes a cover 20e at an upper portion, and the cover 20e is used as a presser to form the rail 20a.

As illustrated in FIGS. 4 and 5, the pair of upper frames 17 are disposed along concave portions 18a provided at left and right edge portions of an upper portion of the case 18, and constitute frame members at upper portions of the windshield 10. The cylinder box 20 has an external form of a pushed-out reversed L shape in a back view, and an upper side portion is placed on an upper surface of the upper frame 17, an inner surface comes into contact with a side surface of the upper frame 17, and a right-angle portion of the reversed L shape engages with a corner portion of the upper frame 17, and the cylinder box 20 is fixed so that its longitudinal direction matches the longitudinal direction of the upper frame 17.

The cylinder box 20 does not have a bottom surface (refer to FIG. 3), and an upper portion of the door 11 is disposed to enter the inside of the cylinder box 20. At a lower end portion of an outer side surface 20b of the cylinder box, an inner flange 20c is formed inward over the entire length in the longitudinal direction. In addition, at a lower portion of an outer side surface 17b of the upper frame 17, a projecting portion 17c extending over the entire length in the longitudinal direction (front-rear direction) is formed to face the inner flange 20c.

The door 11 is held by a holder 16 provided at an entire outer edge portion. At two front and rear positions of an upper portion of the holder 16, holding portions 5 projecting in a thickness direction (left-right direction) of the door 11 are formed orthogonal to a sliding direction (front-rear direction) of the door 11. The upper portion of the door 11 enters a slit (hereinafter, referred to as a guide hole 20d) formed between the inner flange 20c and the projecting portion 17c, and the holding portion 5 of the holder 16 engages with the inner flange 20c and the projecting portion 17c, and holds the door 11 in a hanging manner. Accordingly, the door 11 is disposed to separate from the upper surface of the lower frame 14 and the upper surface of the rail 14a formed on the lower frame 14, and is held slidably along the guide hole 20d. When dust and sand, etc., enter the rail 14a, a sliding resistance when opening and closing the door 11 increases, which makes it difficult to open and close the door 11, and this problem is prevented by hanging the door 11 itself from the upper portion.

The inner flange 20c and the projecting portion 17c are formed by not directly facing each other but being slightly offset in the up-down direction, and the projecting portion 17c at the inner side is at a position slightly higher than the inner flange 20c. This is to hold the door 11 in a stable posture by making slightly higher the inner side of the holding portion to incline the door 11 inward and bringing a lower portion of the door 11 into contact with the side surface of the rail 14a rather than the holding portion 5 projecting to the left and right at the same height from the upper portion of the door 11 and causing a state where the door 11 easily wobbles both leftward and rightward. With this configuration, the door 11 does not wobble when moved, and when opening and closing the door 11, the door 11 can be moved in a state of being kept in the same posture, and unexpected sliding of the door 11 can be prevented.

The holding portion 5 of the door 11 is formed to match the shapes and dispositions of the inner flange 20c and the projecting portion 17c, and consists of a first engagement portion 16b formed to project toward the inner flange 20c side disposed at the outer side, a second engagement portion 16c formed to project toward the projecting portion 17c side disposed at the inner side, and a third engagement portion 16d formed by being offset to the lower side of the second engagement portion 16c.

The third engagement portion 16d is formed to sandwich the projecting portion 17c between the third engagement portion 16d and the second engagement portion 16c, but the third engagement portion 16d is formed with a gap so as to be spaced from a bottom surface of the projecting portion 17c.

In the present embodiment, a hanging support form of the door 11 is configured in this way, however, other conventionally known configurations may also be used such as a form in which the holding portion 5 formed into a T shape is engaged in a slit formed in a flat plate or a form in which the holding portion 5 formed into a hook shape is engaged with a projecting rail.

As illustrated in FIG. 5, at a front end upper portion of the holder 16, a coupling portion 16e is formed. The coupling portion 16e is provided to project to the upper side of the door 11, and in the center of the coupling portion, a coupling hole 16f is formed along the sliding direction of the door 11. A tip end of a piston rod 40a extending from the piston inside the air cylinder 40 is fitted and fixed into the coupling hole 16f. The piston (piston rod 40a) is connected to the door 11 by the holder 16, and by the piston being moved forward and rearward by air, the holder 16 slides along the guide hole 20d, so that the door 11 opens and closes.

Even in the state where the holder 16 is engaged with the inner flange 20c, the air cylinder 40 does not come into contact with an upper surface of the holder 16, and is fixed at a distance from the holder 16 (refer to FIG. 3), and the air cylinder 40 does not obstruct movement of the door 11. The coupling portion 16e projects to a higher position than the upper surface of the holder 16, however, because the coupling portion 16e is fixed to the tip end of the piston rod 40a, the coupling portion 16e does not enter the lower side of the air cylinder 40, and a path of the coupling portion 16e is secured inside the cylinder box 20, so that the cylinder box 20 and the coupling portion 16e do not interfere with each other.

The air cylinder 40 serving as a driving means of the door 11 is disposed substantially right above the door 11 so as to be parallel to the sliding direction of the door 11. The holder 16 that supports the door 11 in a hanging manner is joined to the air cylinder 40 by the coupling portion 16e formed on the upper surface, so that the air cylinder 40 directly slides the holder 16 supporting the door 11 in a hanging manner to open and close the door 11. Therefore, force transmissibility from the air cylinder 40 is high, the door 11 can be opened and closed with small force, and the door 11 can be smoothly opened and closed.

(Block Diagram)

Figure 6:
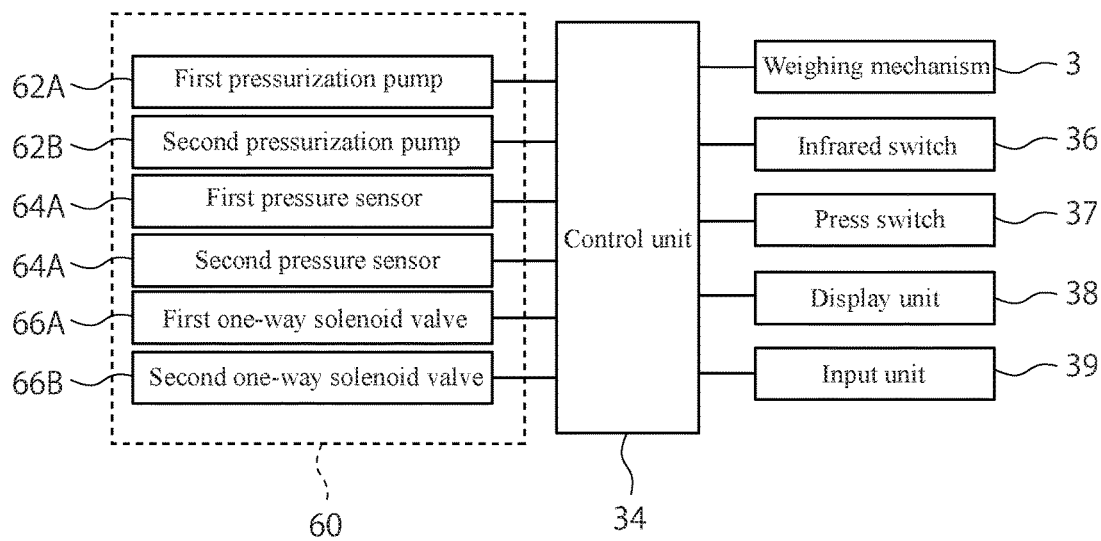
FIG. 6 is a block diagram of the electronic balance according to the first embodiment.

An automatic opening and closing mechanism of the door 11 will be described in detail. FIG. 6 is a block diagram of a control mechanism of the electronic balance 1, and FIG. 7 is a block diagram of an opening and closing mechanism 60 that opens and closes the door 11.

As illustrated in FIG. 6, the electronic balance 1 includes the weighing mechanism 3, and a first pressurization pump 62A, a second pressurization pump 62B, a first pressure sensor 64A, a second pressure sensor 64B, a first one-way solenoid valve 66A, and a second one-way solenoid valve 66B, provided in the windshield 10 and constituting the opening and closing mechanism 60, and further includes the push switch 37, the infrared switch 36, the input unit 39, and the display unit 38, provided on the control panel 35, and a control unit 34 that controls all of these components. The control unit 34 generates various command signals based on input signals. In the present embodiment, the control unit 34 controls both of the windshield 10 and the balance main body 30, but a configuration in which a windshield control unit is used for the windshield 10 so as to control the opening and closing mechanism 60, and the windshield 10 and the balance main body 30 are controlled independently of each other is also possible. Further, the infrared switch 36 and the push switch 37 as opening and closing switches for the doors 11 may be directly provided on the windshield 10.

Figure 7:
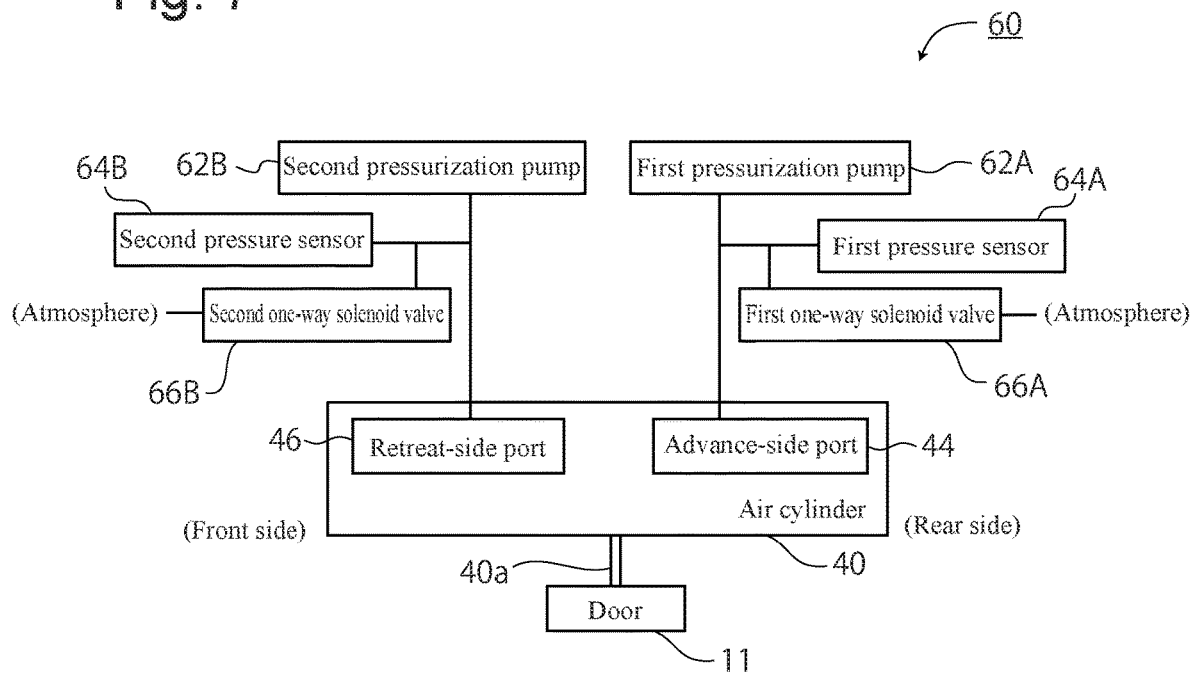
FIG. 7 is a block diagram of the opening and closing mechanism of the door according to the first embodiment.

The opening and closing mechanism 60 illustrated in FIG. 7 is a mechanism for automatically opening and closing the door 11, and each of the left and right doors 11 includes the opening and closing mechanism 60, and is controlled independently by the connected opening and closing mechanism 60. The air cylinder 40 is connected to the door 11 through a piston rod 40a, and a pump that moves forward (advances) the piston inside the air cylinder 40 (that is, the piston rod 40a extending from the piston) and a pump that moves rearward (retreats) the piston, exist separately.

Both of the first pressurization pump 62A and the second pressurization pump 62B are air pumps. These pumps are drive sources of the air cylinder 40, and compress air and feed the compressed air to the air cylinder 40, and move the piston by air pressure to move the door 11.

Outlet sides of the first one-way solenoid valve 66A and the second one-way solenoid valve 66B are opened to the atmosphere, and by opening and closing the valves, the flow and stoppage of air are controlled.

The first pressure sensor 64A and the second pressure sensor 64B monitor air pressures.

To the advance-side port 44 provided at the rear side of the air cylinder 40, the first pressurization pump 62A for moving the piston forward is connected. This connection has a branch halfway, and the first pressure sensor 64A and the first one-way solenoid valve 66A are further connected. Therefore, the first pressure sensor 64A monitors an air pressure of a section from the first pressurization pump 62A to the air cylinder 40 through the advance-side port 44. Specifically, the first pressure sensor 64A performs monitoring of an air pressure to be supplied to the air cylinder 40 when the first pressurization pump 62A is activated, detection of an air pressure decrease caused by opening of the first one-way solenoid valve 66A, detection of an air pressure change accompanying a piston movement/stoppage of the air cylinder 40, etc.

Similarly, to the retreat-side port 46 provided at the front side of the air cylinder 40, the second pressurization pump 62B for moving the piston rearward is connected. This connection has a branch halfway, and the second pressure sensor 64B and the second one-way solenoid valve 66B are further connected. The second pressure sensor 64B monitors an air pressure of a section from the second pressurization pump 62B to the air cylinder 40 through the retreat-side port 46. Specifically, the second pressure sensor 64B performs monitoring of an air pressure to be supplied to the air cylinder 40 when the second pressurization pump 62B is activated, detection of an air pressure change caused by opening of the first one-way solenoid valve 66A, detection of an air pressure change accompanying a piston movement/stoppage of the air cylinder 40, etc.

Operations of both pressurization pumps (62A and 62B) and both one-way solenoid valves (66A and 66B) of the opening and closing mechanism 60 are controlled by the control unit 34. The control unit 34 determines operation commands for various components based on measurement values of the pressure sensors (64A and 64B) and commands from the control panel 35.

(Operations when Opening and Closing Door)

Next, opening and closing of the door 11 will be described. In the present embodiment, an assist mode AM is provided as an opening and closing mode. The assist mode AM can be switched between valid/invalid by the input unit 39.

When the assist mode AM is invalid, as a "standard state," the door 11 can be manually opened and closed, and when an opening/closing command is additionally input from the push switch 37 or the infrared switch 36, the door 11 is automatically opened/closed. Switching a setting between automatic opening/closing and manual opening/closing is unnecessary. While the door 11 is manually openable and closable, the door 11 can also be automatically opened and closed in response to a switch input, and after the door 11 is automatically opened or closed, manual opening and closing become possible immediately without any special operation.

When the assist mode AM is valid, movements of the door 11 are monitored, and based on a detected movement of the door 11 from a stationary state and a direction of the movement, an operator's action is assisted. That is, when an operator manually slightly opens or closes the door 11 being in a stationary state, this operation is detected, and thereafter the door 11 is automatically opened or closed. For example, even when the hands of the operator are full of a specimen, just by pushing the handle 15 in a direction in which the operator desires to open or close the door 11 by the back of his/her hand, the door 11 is automatically opened or closed. In the assist mode AM, an operation to assist manual opening/closing is performed, and this is more intuitive and convenient for use than a switch operation. Upon automatic opening by slight pushing of the door 11 by the operator holding and carrying a specimen to the front of the door 11, the operator can immediately place the specimen in the weighing chamber S, so that the work efficiency is also high. Moving the door 11 from a stationary state to open/close it by an operator works as a trigger, and thus rarely causes erroneous activation unlike a non-contact switch.

The configuration is made so that automatic opening and closing in response to a switch input are also possible even while the assist mode AM is valid, and when a command is input from the push switch 37 or the infrared switch 36, the door 11 is automatically opened or closed.

(Assist Mode)

Operations of the respective components in the first embodiment will be described. FIG. 8 is an operation chart of the opening and closing mechanism 60.

First, when the assist mode AM is invalid, a "standard state" where a user can manually freely open and close the door 11 is entered. In the standard state, neither the first pressurization pump 62A nor the second pressurization pump 62B is activated, and the first one-way solenoid valve 66A and the second one-way solenoid valve 66B are open. Because neither of the pressurization pumps (62A and 62B) operates and both one-way solenoid valves (66A and 66B) are opened and communicate with the atmosphere, no load is applied from the air cylinder 40, and the door 11 can be smoothly manually opened and closed.

When a command to "open/close the door" is input from the infrared switch 36 or the push switch 37 on the control panel 35, the control unit 34 commands the respective components to operate.

In a case of an "automatic opening operation" to open the door 11, that is, in a case where the piston inside the air cylinder 40 is moved rearward, the second one-way solenoid valve 66B is closed, and pressurization of the second pressurization pump 62B is started. At this time, the first pressurization pump 62A is not activated, and the first one-way solenoid valve 66A is open, so that the piston is moved rearward by an air pressure, and the door 11 is opened.

When the door 11 fully opens, the air pressure rapidly increases, so that when this change is detected by the second pressure sensor 64B, the second pressurization pump 62B is stopped, the second one-way solenoid valve 66B is opened, and the compressed air inside the air cylinder is released to the atmosphere, and the mechanism returns to the standard state.

In a case of an "automatic closing operation" to close the door 11, that is, in a case where the piston inside the air cylinder 40 is moved forward, the first one-way solenoid valve 66A is closed, and pressurization of the first pressurization pump 62A is started. At this time, the second pressurization pump 62B does not operate, and the second one-way solenoid valve 66B is open, so that the piston is moved forward by an air pressure, and the door 11 is closed.

When the door 11 fully closes, the air pressure rapidly increases again, so that when this change is detected by the first pressure sensor 64A, the first pressurization pump 62A is stopped, the first one-way solenoid valve 66A is opened, and the compressed air inside the air cylinder is released to the atmosphere, and the mechanism returns to the standard state.

When one pressurization pump operates, the other pressurization pump does not operate, and only one solenoid valve is closed, and the other solenoid valve is opened and communicates with the atmosphere. When the pump that has been operating stops, the closed solenoid valve opens and communicates with the atmosphere. In other words, all of the one-way solenoid valves are configured to open and communicate with the atmosphere when the pressurization pumps stop. After the door 11 is automatically opened/closed, air is released to the atmosphere, and the load applied to the door 11 is eliminated, and it becomes possible to smoothly manually move the door 11. The door 11 is automatically openable and closable, while after it is automatically opened/closed, manual opening and closing are enabled immediately without any special operation.

Next, a case where the assist mode AM is valid will be described.

When the assist mode is valid, as a standby state, neither the first pressurization pump 62A nor the second pressurization pump 62B is activated, and the first one-way solenoid valve 66A and the second one-way solenoid valve 66B are closed. Because neither of the one-way solenoid valves (66A, 66B) communicates with the atmosphere, although there is a slight load for the operator to move the door 11 manually, neither of the pressurization pumps (62A and 62B) is operating, so that the operator can move the door without problem.

When the assist mode AM is in the standby state and the operator slightly opens the door 11 being in a stationary state, the piston inside the cylinder tube is also moved rearward through the piston rod 40a joined to the door 11, so that an air pressure at the advance-side port 44 side increases as much as the push by the piston (at the same time, at the retreat-side port 46 side, the air pressure decreases). When this operation is detected as an air pressure increase by the first pressure sensor 64A disposed at the advance-side port 44 side, the control unit 34 determines that "the operator is trying to open the door 11," and performs an "automatic opening operation" to assist the operation of the operator. That is, the first one-way solenoid valve 66A is opened, and pressurization of the second pressurization pump 62B is started. The first pressurization pump 62A is not activated, and the second one-way solenoid valve 66B is closed, so that the piston is moved rearward by the air pressure, and the door 11 is opened.

When the door 11 fully opens, the air pressure rapidly increases, and when this change is detected by the second pressure sensor 64B, the second pressurization pump 62B is stopped, the second one-way solenoid valve 66B is opened, and the compressed air inside the air cylinder 40 is released to the atmosphere, and the mechanism returns to the standard state once. Then, for returning to the assist mode AM standby state again, the first one-way solenoid valve 66A and the second one-way solenoid valve 66B are closed.

On the other hand, while the assist mode AM is valid, when the operator slightly moves forward the door 11 being in a stationary state in order to close the door 11 being in an opened state, the piston inside the cylinder tube is also moved forward through the piston rod 40a joined to the door 11, so that the air pressure at the retreat-side port 46 side increases as much as the push by the piston (at the same time, at the advance-side port 44 side, the air pressure decreases). When this operation is detected as an air pressure increase by the second pressure sensor 64B disposed at the retreat-side port 46 side, the control unit 34 determines that "the operator is trying to close the door 11," and performs an "automatic closing operation" to assist the operation of the operator. That is, the second one-way solenoid valve 66B is opened, and pressurization of the first pressurization pump 62A is started. The second pressurization pump 62B is not activated, and the first one-way solenoid valve 66A is closed, so that the piston is moved forward by the air pressure, and the door 11 is closed.

When the door 11 reaches a fully closed state, the air pressure rapidly increases, and when this change is detected by the first pressure sensor 64A, the first pressurization pump 62A is stopped, the first one-way solenoid valve 66A is opened, and the compressed air inside the air cylinder 40 is released to the atmosphere, and the mechanism returns to the standard state once. Then, for returning to the assist mode AM standby state again, the first one-way solenoid valve 66A and the second one-way solenoid valve 66B are closed.

(Half-Opening Mechanism)

Figure 9:
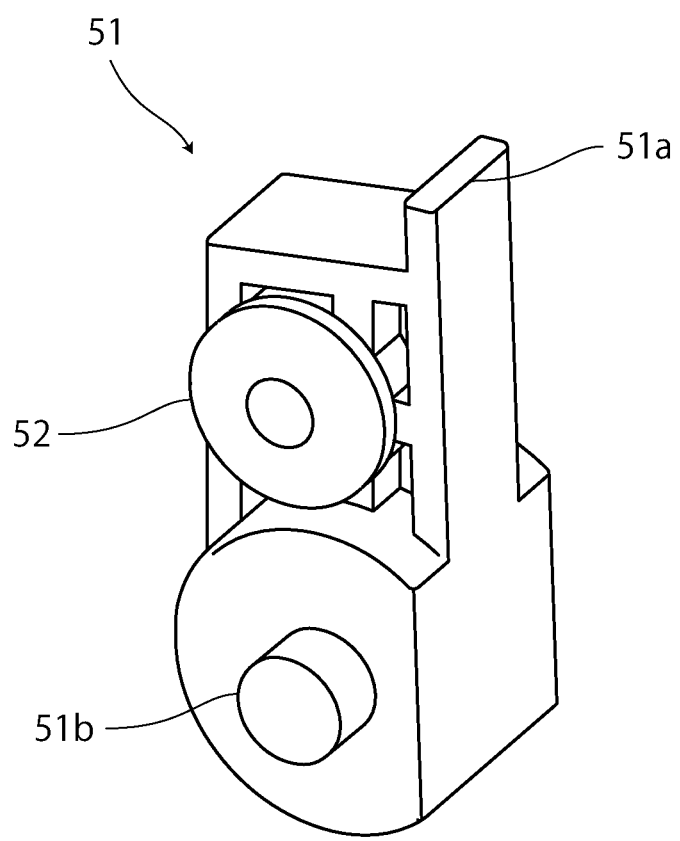
FIG. 9 is a perspective view of a stopper.
Figure 10A:
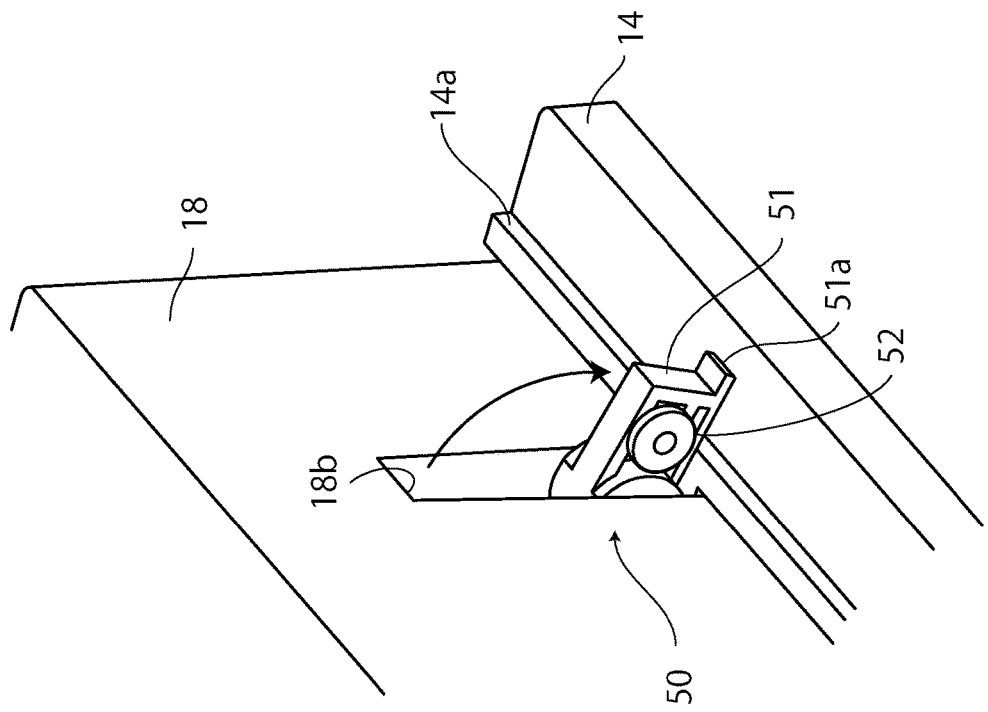
FIGS. 10A and 10B are explanatory views for describing a half-opening mechanism according to the first embodiment.
Figure 10B:
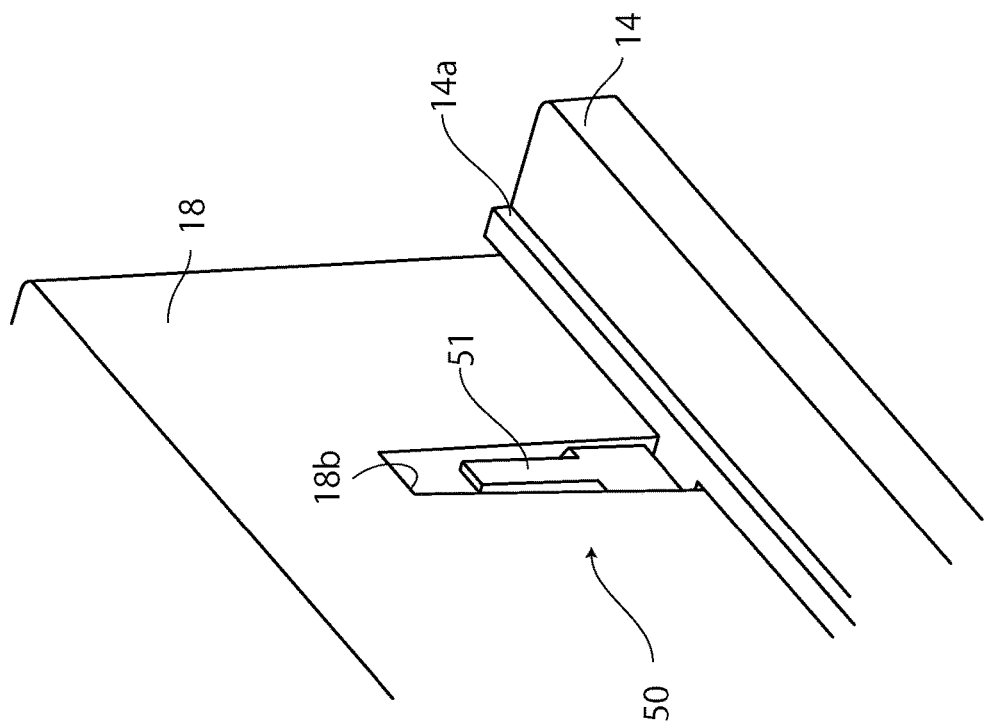

Next, a half-opening mechanism 50 for half-opening/closing the door 11 will be described. FIG. 9 is a perspective view of a stopper 51 serving as a latching member of the door 11. FIGS. 10A and 10B are enlarged views of portion A in FIG. 1, and explanatory views for describing a turning state of the stopper 51 by illustrating only the case 18 and the stopper 51. FIG. 10(A) illustrates a non-use state of the stopper 51, and FIG. 10(B) illustrates a use state of the stopper 51.

As illustrated in FIG. 9, the stopper 51 has an external form having an upper portion in a substantially rectangular parallelepiped shape, and a lower portion in a columnar shape. A grip portion 51a projecting on the upper surface is formed, and a rotary shaft 51b projecting in a front-rear direction in the center of the columnar shape of the lower portion is formed. At an upper portion of the front surface of the stopper 51, an elastic member 52 is fitted and fixed into a hole (not illustrated) formed.

In a side surface of the case 18, a storage portion 18b formed and recessed inward to match a size of the stopper 51 is provided (refer to FIG. 2). The stopper 51 is disposed inside the storage portion 18b so that the rotary shaft 51b becomes parallel to the sliding direction of the door 11, and is held turnably around the rotary shaft 51b. At this time, the elastic member 52 is disposed at a side (front side) where the door 11 is disposed.

As illustrated in FIG. 10(A), when the stopper 51 is not used, the stopper 51 is held in an erect state inside the storage portion 18b. Therefore, the stopper 51 does not block movements of the door 11.

As illustrated in FIG. 10(B), when the stopper 51 is used, the grip portion 51a at the upper portion is gripped and the stopper 51 is drawn out from the storage portion 18b. The stopper 51 turns from the state illustrated in FIG. 10(A), and in a state where the upper portion of the stopper 51 crosses the rail 14a, a side surface of the stopper 51 comes into contact with the upper surface of the rail 14a to be held.

The stopper 51 is disposed for the purpose of blocking a movement of the door 11, and according to a turning angle of the stopper 51, the stopper 51 is selectively disposed on or out of the movement path of the door 11.

A configuration for stopping the door 11 and half-opening and closing operations will be described in detail.

When the door 11 is at a fully closed position, it comes into contact with the front glass 12. Specifically, the door comes into contact with an elastic member not illustrated provided on a back surface of the front glass 12. As described above, in the present embodiment, the windshield 10 is not provided with a light sensor such as a position sensor or a distance sensor to detect a disposition of the door 11, and is configured so that an increase in air pressure is detected by a pressure sensor, and when the air pressure reaches a predetermined value or more, a pressurization pump is stopped. The increase in air pressure is caused when the pressurization pump tries to continue air feeding even in a state where a movement of the piston is blocked for some reason.

In an "automatic closing operation," the door 11 comes into contact with the front glass 12, and accordingly, the piston that has moved the door 11 also becomes immovable, and the first pressurization pump 62A tries to feed air and the air pressure increases, and the first pressure sensor 64A detects this increase and stops the first pressurization pump 62A.

In an "automatic opening operation," the piston moves to an end portion of the air tube inside the air cylinder 40, and comes into contact with the end portion and becomes immovable, and the second pressurization pump 62B tries to feed air and the air pressure increases, and the second pressure sensor 64B detects this increase and stops the second pressurization pump 62B.

As described above, a configuration is provided in which the air cylinder 40 is used as a driving means of the door 11, movements of the door 11 are monitored by the pressure sensors, and the piston inside the air cylinder 40 or the door 11 connected to the piston comes into contact with something and accordingly the air pressure inside the air cylinder 40 rises, and when the pressure sensor detects that the air pressure has reached a predetermined value or more, the pressurization pump is stopped, so that the movement of the door 11 is stopped. That is, the configuration is made such that a movement of the door 11 stops by coming into contact with something, and a stop position of the door 11 is determined according to a disposed position of an object that comes into contact with the door 11 and blocks the movement of the door.

Even during a movement of the door 11, when the door 11 comes into contact with a movement blocking object, the door stops at the contact position, and when a next opening/closing signal is input, air is fed from the opposite port, so that the door starts to move in the opposite direction from that stop position. By disposing a movement blocking object at a desired position on the movement path of the door 11, a stop position of the door 11 can be freely determined.

That is, the door 11 is configured to be stopped from an automatic opening/closing operation by coming into contact with something, and by utilizing this, the half-opening mechanism 50 automatically half-opens/closes the door 11.

When the stopper 51 is not disposed on the movement path of the door 11, a movement of the door 11 is not obstructed and the door 11 is automatically fully opened and closed, however, when the stopper 51 is disposed on the movement path of the door 11, halfway through the movement from a fully closed state to a fully opened state, the door 11 comes into contact with the elastic member 52 fitted to the stopper 51 and stops, and when a next opening/closing signal is input, the door 11 moves forward from that stop position and comes into contact with the front glass 12, and stops at the fully closed position. The stopper 51 is disposed substantially in the middle of the movement path of the door 11, so that by using (turning) the stopper 51, the door 11 can be automatically half-opened/closed.

By disposing/removing the stopper 51 on or from the movement path of the door 11, in other words, with a turning state of the stopper 51, the door 11 can be easily switched between full-opening/closing and half-opening/closing. The position of the stopper 51 can be changed just by drawing out or pushing, and thus disposition change is extremely simple, and the state of setting can also be grasped at a glance.

Here, the half-opening function is a function to automatically half-open/close the door 11. The stopper 51 also serves as a changeover switch of the half-opening function, and depending on whether or not using the stopper 51, full-opening/closing or half-opening/closing can be selected at the time of automatic opening/closing. Regardless of whether the assist mode AM is valid or invalid, a command to automatically open/close the door 11 is accepted, so that the half-opening function works regardless of the assist mode AM.

That is, in a case where the assist mode AM is invalid, when the stopper 51 is inside the storage portion 18b (refer to FIG. 10(A)), the door 11 fully opens/closes automatically in response to an input from the push switch 37 or the infrared switch 36. When the stopper 51 is drawn out from the storage portion 18b and disposed on the path (refer to FIG. 10(B)), the door 11 automatically half-opens/closes in response to an input from the push switch 37 or the infrared switch 36.

In a case where the assist mode AM is valid, when the stopper 51 is inside the storage portion 18*b* (refer to FIG. 10(A)), in response to an input from the push switch 37 or the infrared switch 36 or a slight movement of the door 11 by an operator, the door 11 is automatically fully opened or closed. When the stopper 51 is drawn out from the storage portion 18*b* and disposed on the path (FIG. 10(B)), in response to an input from the push switch 37 or the infrared switch 36 or a slight movement of the door 11 by an operator, the door 11 is automatically half-opened or closed.

In this way, the half-opening function and the assist mode AM are compatible without inhibiting their operations.

(Flowcharts)

Next, flows of opening and closing operations of the door 11 will be described with reference to the flowcharts of FIGS. 11 and 12.

Figure 11:
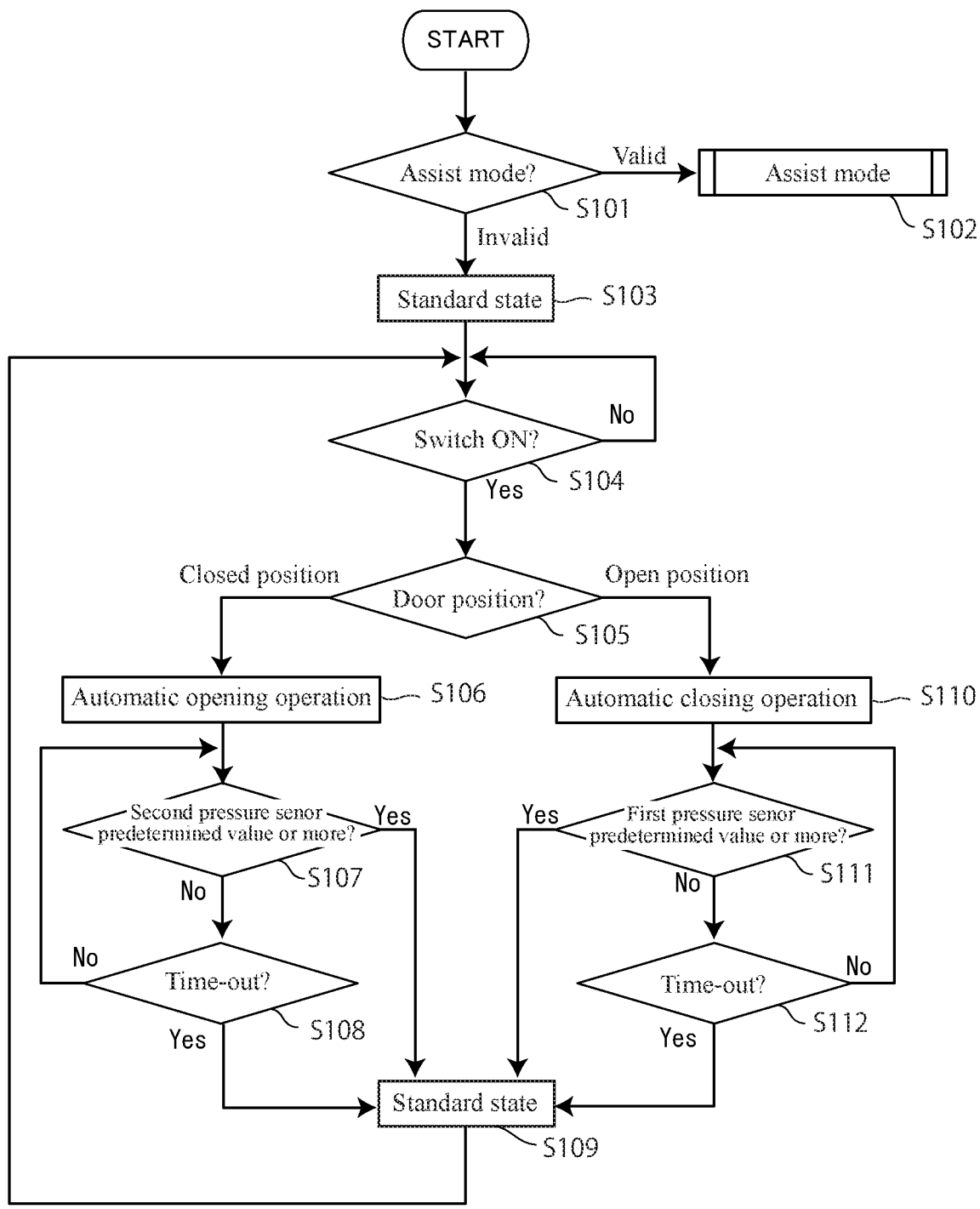
FIG. 11 is a flowchart of opening and closing operations for the door according to the first embodiment.

As illustrated in FIG. 11, first, in Step S101, whether the assist mode AM is valid/invalid is checked. When it is valid, the assist mode AM is entered (Step S102). A case where the assist mode AM is valid will be described later, and a case where the assist mode AM is invalid (Steps S103 to S112) will be described first.

When the assist mode AM is invalid, the process shifts to Step S103, and the opening and closing mechanism 60 enters the standard state. Specifically, the first pressurization pump 62A and the second pressurization pump 62B do not operate, and the first one-way solenoid valve 66A and the second one-way solenoid valve 66B are opened (refer to FIG. 8).

Next, in Step S104, a command signal to open and close the door 11 is input from the infrared switch 36 or the push switch 37 serving as a switch to open and close the door 11. When the signal is not input, the mechanism waits for the input.

When a command is input, the process shifts to Step S105, and whether the door 11 is positioned at a closed position or at an open position is checked. In the present embodiment, the control unit 34 keeps a last opening/closing operation of the door 11 in memory, and makes determination according to the content.

Here, the door 11 is configured so that it can be automatically half-opened and further, can also be manually opened and closed, so that the door 11 that is open even slightly is regarded as being in an opened state, and the door 11 being at an open position means that the door 11 is not at a fully closed position. On the other hand, the door 11 being at a closed position means that the door 11 is in a fully closed state. Therefore, a configuration may be possible in which a sensor is provided at the fully closed position of the door 11 so as to determine whether the door 11 is at the closed position.

First, a case where the door 11 is at the closed position (Steps S106 to S108) will be described.

When the door 11 is at the closed position, the process shifts to Step S106, and in order to open the door 11 being at the closed position, an "automatic opening operation" for the door 11 is performed. Specifically, the second one-way solenoid valve 66B is closed, and pressurization of the second pressurization pump 62B is started. At this time, the first one-way solenoid valve 66A is left open, and the first pressurization pump 62A is not activated (refer to FIGS. 7 and 8).

Next, in Step S107, whether a measurement value of the second pressure sensor 64B is a predetermined value or more is determined. When the door 11 starts to move, the air pressure decreases once, and after the movement of the door 11 is completed, the air pressure rapidly increases, and when the measurement value of the second pressure sensor 64B reaches the predetermined value or more, it is determined that the opening operation for the door 11 has finished.

The increase in air pressure is caused by blockage of a movement of the door 11. As described above, when the half-opening function is OFF, the piston joined to the door 11 comes into contact with an end portion of the cylinder tube, and when the half-opening function is ON, the piston comes into contact with the stopper 51 and the air pressure increases. In this way, depending on whether the half-opening function is ON or OFF, only the stop position of the door 11 in an opened state is different, and in either case, it is determined whether a measurement value of the second pressure sensor 64B is the predetermined value or more.

When the measurement value of the second pressure sensor 64B reaches the predetermined value or more, it is determined that the door 11 has been opened, and the process shifts to Step S109, the operation of the second pressurization pump 62B is stopped, and the second one-way solenoid valve 66B is opened. Accordingly, the mechanism returns to the standard state, and manual opening and closing become possible.

When the measurement value of the second pressure sensor 64B is less than the predetermined value, the process shifts to Step S108.

In Step S108, the control unit 34 has activated an internal timer from the start of pressurization of the second pressurization pump 62B, and accordingly, whether it has exceeded a predetermined time is determined. When the timer has timed out (exceeded the predetermined time), the process shifts to Step S109, and the mechanism returns to the standard state. When the predetermined time has not elapsed yet, the process returns to Step S107. The configuration is made so that even if the measurement value of the second pressure sensor 64B is less than the predetermined value, when the predetermined time elapses, the process shifts to Step S109 and the mechanism returns to the standard state.

Steps S107 and S108 also serve as a safety function. During a movement of the door 11, when the operator's fingers are caught and pinched in the door 11, or even when there is a trouble in the movement of the door 11 and the movement is forcibly stopped, the air pressure increases. This increase is detected by the second pressure sensor 64B and the movement of the door 11 is immediately stopped, both one-way solenoid valves (66A and 66B) are caused to communicate with the atmosphere, and the load to the door 11 is eliminated and safety is secured. In addition, when an unexpected high air pressure is applied due to a failure or the like, an emergency stop is made. By the configuration in which pressurization by the pump is stopped when the air pressure reaches the predetermined value or more, safety is secured.

Further, although a last position of the door 11 is kept in memory, in the present embodiment, manual opening and closing are also possible when the assist mode AM is invalid, and the position of the door 11 has been moved by a user in some cases. In a case where the door 11 is already in an opened state by a manual operation, even when an automatic opening operation is performed, the air pressure reaches the predetermined value or more soon, so that the movement is stopped. In this way, an erroneous determination of the position of the door 11 can also be secured by this step S107.

By further preparing such a time-out mechanism, a configuration is made in which, when the air pressure does not increase, for example, when air leakage or a failure is suspected, forcible termination is avoided and the door is stopped once as error processing.

Next, a case (Steps S110 to S112) where the door 11 is at an open position in Step S105 will be described.

When the door 11 is at an open position, the process shifts to Step S110, and in order to close the door 11 being at the open position, an "automatic closing operation" for the door 11 is performed. Specifically, the first one-way solenoid valve 66A is closed, and operation of the first pressurization pump 62A is started. At this time, the second one-way solenoid valve 66B is left open, and the second pressurization pump 62B is not activated (refer to FIGS. 7 and 8).

Next, the process shifts to Step S111, and whether a measurement value of the first pressure sensor 64A has reached a predetermined value or more is determined. As described above, this is a determination as to whether the door 11 has been closed.

When the measurement value of the first pressure sensor 64A reaches the predetermined value or more, it is determined that the door 11 has been closed, and the process shifts to Step S109, the operation of the first pressurization pump 62A is stopped, and the first one-way solenoid valve 66A is opened. Accordingly, the mechanism returns to the standard state, and manual opening and closing become possible.

When the measurement value of the first pressure sensor 64A is less than the predetermined value, the process shifts to Step S112.

In Step S112, the control unit 34 has activated an internal timer from the start of operation of the first pressurization pump 62A, and accordingly, whether it has exceeded a predetermined time is determined. When the timer has timed out (exceeded the predetermined time), the process shifts to Step S109, and the mechanism returns to the standard state. When the predetermined time has not elapsed yet, the process returns to Step S111. The configuration is made so that even if the measurement value of the first pressure sensor 64A is less than the predetermined value, when the predetermined time elapses, the process shifts to Step S109 and the mechanism returns to the standard state.

The configurations and effects of Steps S111 and S112 are equivalent to those of Steps S107 and S108, and determine not only a closed state but also serve as a safety function.
(Flow when Assist Mode is Valid)

Next, a flow of operation of the opening and closing mechanism 60 when the assist mode AM is valid will be described.

Figure 12:
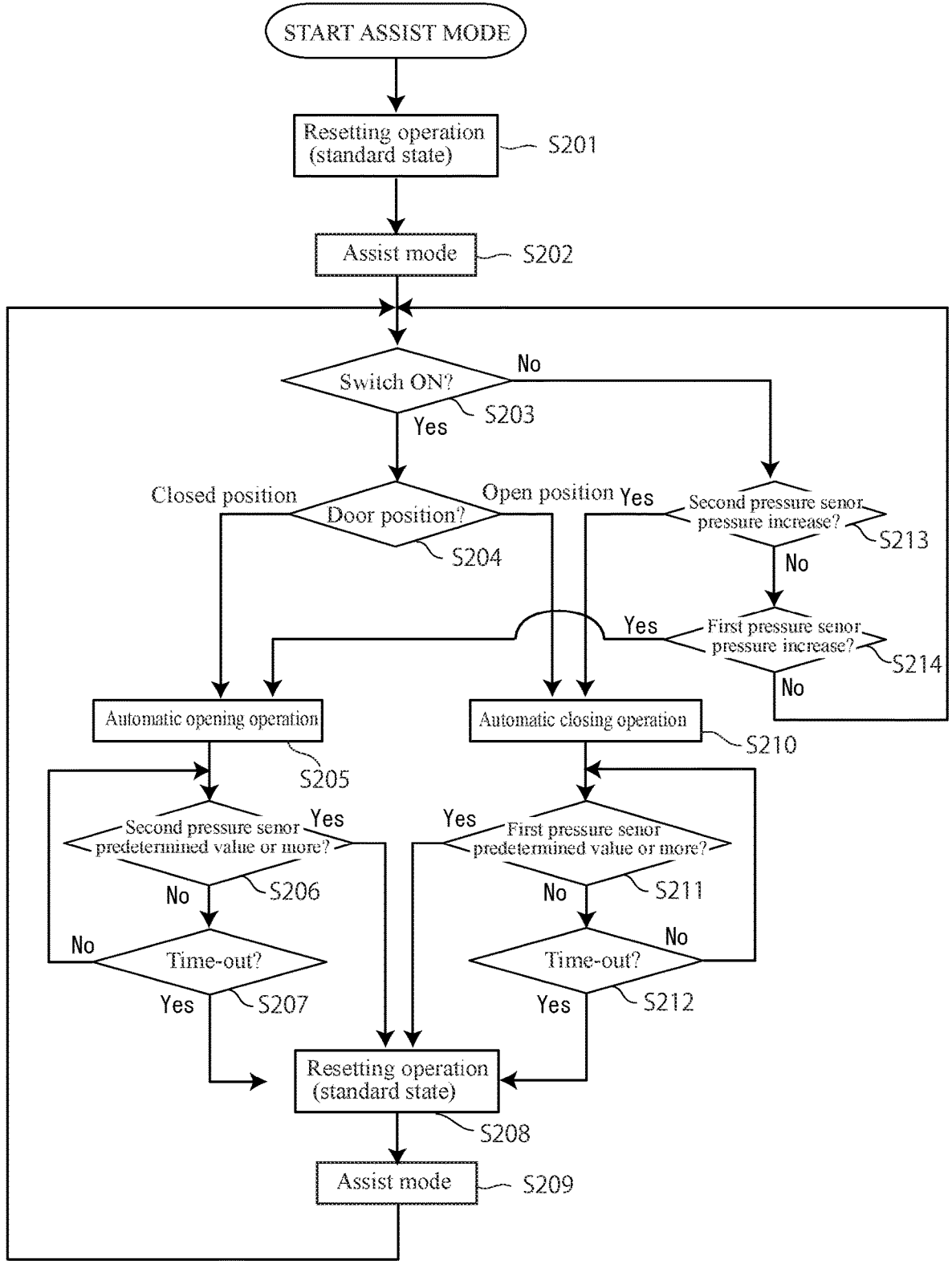
FIG. 12 is a flowchart of an assist mode according to the first embodiment.

As illustrated in FIG. 12, first, in Step S201, as a resetting operation, the mechanism enters the standard state once. In detail, the first one-way solenoid valve 66A and the second one-way solenoid valve 66B are opened. At this time, the first pressurization pump 62A and the second pressurization pump 62B are not operating (refer to FIG. 8).

Next, the process shifts to Step S202, and the standby state of the assist mode AM is entered. Specifically, the first one-way solenoid valve 66A and the second one-way solenoid valve 66B are closed. Both pressurization pumps (62A and 62B) do not operate (refer to FIG. 8).

Next, the process shifts to Step S203, and when a command is input from the switch, the process shifts to Step S204. When no command is input from the switch, the process shifts to Step S213. The case where no command is input (Steps S213 and S214) will be described later, and the case where a command is input (Steps S204 to S212) will be described first.

Steps S204 to S208 respectively correspond to Steps S105 to S109, and are equivalently configured.

When an opening/closing command is input from the switch, the process shifts to Step S204, and whether the door 11 is positioned at a closed position or at an open position is checked. The control unit 34 keeps a last opening/closing operation of the door 11 in memory, and makes determination according to the content.

First, a case where the door 11 is at the closed position (Steps S205 to S208) will be described.

When the door 11 is at the closed position, the process shifts to Step S205, and in order to open the door 11 being at the closed position, an "automatic opening operation" for the door 11 is performed. Specifically, the first one-way solenoid valve 66A is opened, and pressurization of the second pressurization pump 62B is started. At this time, the second one-way solenoid valve 66B is left closed, and the first pressurization pump 62A is not activated (refer to FIGS. 7 and 8).

Next, in Step S206, whether a measurement value of the second pressure sensor 64B has reached a predetermined value or more is checked. When the measurement value of the second pressure sensor 64B is less than the predetermined value, it is determined that the door 11 has not been opened to a predetermined position yet, and the process shifts to Step S207, and when the measurement value of the second pressure sensor 64B exceeds the predetermined value, the process shifts to Step S208.

In Step S207, whether an internal timer has timed out is determined. The control unit 34 has activated the internal timer from the start of pressurization of the second pressurization pump 62B, and when the timer has timed out exceeding the predetermined time, the process shifts to Step S208. When the predetermined time has not elapsed yet, the process returns to Step S206.

When the measurement value of the second pressure sensor 64B reaches the predetermined value or more, or when the timer times out while the measurement value of the second pressure sensor 64B is still less than the predetermined value, the process shifts to Step S208, and the operation of the second pressurization pump 62B is stopped, the second one-way solenoid valve 66B is opened, and as a resetting operation, the mechanism enters the standard state.

Next, the process shifts to Step S209, and to bring the assist mode AM into the standby state again, the first one-way solenoid valve 66A and the second one-way solenoid valve 66B are closed.

Next, a case (Steps S210 to S212) where the door 11 is at an open position in Step S204 will be described. These steps respectively correspond to Steps S110 to S112, and are almost equivalently configured.

When the door 11 is at an open position, the process shifts to Step S210, and in order to close the door 11 being at the open position, an "automatic closing operation" for the door 11 is performed. Specifically, the second one-way solenoid valve 66B is opened, and the operation of the first pressurization pump 62A is started. At this time, the first one-way solenoid valve 66A is left closed, and the second pressurization pump 62B is not activated (refer to FIGS. 7 and 8).

Next, in Step S211, whether a measurement value of the first pressure sensor 64A has reached a predetermined value or more is checked. When the measurement value of the first pressure sensor 64A is less than the predetermined value, it is determined that the door 11 has not been closed to a desired position yet, and the process shifts to Step S212, and when the measurement value of the first pressure sensor 64A exceeds the predetermined value, the process shifts to Step S208.

In Step S212, whether an internal timer has timed out is determined. The control unit 34 has activated the internal timer from the start of pressurization of the first pressurization pump 62A, and when the timer has timed out exceeding the predetermined time, the process shifts to Step S208. In a case where the predetermined time has not elapsed yet, the process returns to Step S211.

When the value of the first pressure sensor 64A reaches the predetermined value or more, or when the timer times out while the measurement value of the first pressure sensor 64A is still less than the predetermined value, the process shifts to Step S208, and the operation of the first pressurization pump 62A is stopped, the first one-way solenoid valve 66A is opened, and the mechanism enters the standard state.

The process shifts to Step S209, and to bring the assist mode into the standby state again, the first one-way solenoid valve 66A and the second one-way solenoid valve 66B are closed.

Next, a case where no command has not been input from the switch in Step S203 and the process has shifted to Step S213 will be described.

In Step S213, whether an increase in air pressure has been detected by the second pressure sensor 64B is determined. As described above, when the assist mode AM is in the standby state, the first one-way solenoid valve 66A and the second one-way solenoid valve 66B are closed, so that detection of an air pressure increase by the second pressure sensor 64B disposed at the front side is caused by an operator moving the door 11 forward, that is, trying to close the door 11. Therefore, when the second pressure sensor 64B detects an increase in air pressure, to assist the operation to close the door 11, the process shifts to Step S210 and an automatic closing operation is performed. When the second pressure sensor 64B does not detect an increase in air pressure, the process shifts to Step S214.

Next, in Step S214, whether an increase in air pressure has been detected by the first pressure sensor 64A is determined. Detection of an increase in air pressure by the first pressure sensor 64A disposed at the rear side is caused by an operator moving the door 11 rearward, that is, trying to open the door 11. Therefore, when the first pressure sensor 64A detects an increase in air pressure, to assist the operation to open the door 11, the process shifts to Step S205 and an automatic opening operation is performed. When the first pressure sensor 64A does not detect an increase in air pressure, the process returns to Step S203.

Second Embodiment

Figure 13:
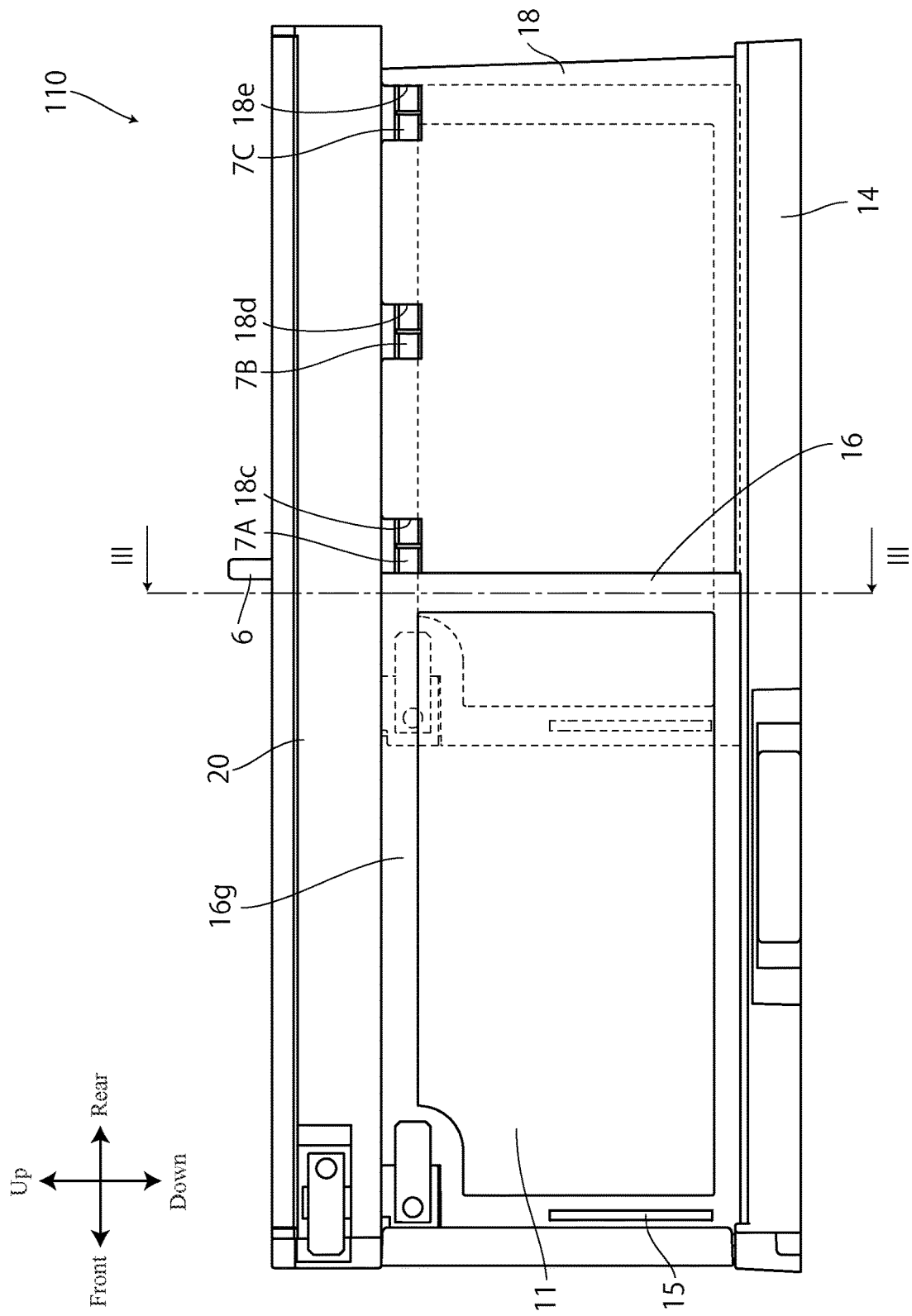
FIG. 13 is a side view of a windshield according to a second embodiment.
Figure 14:
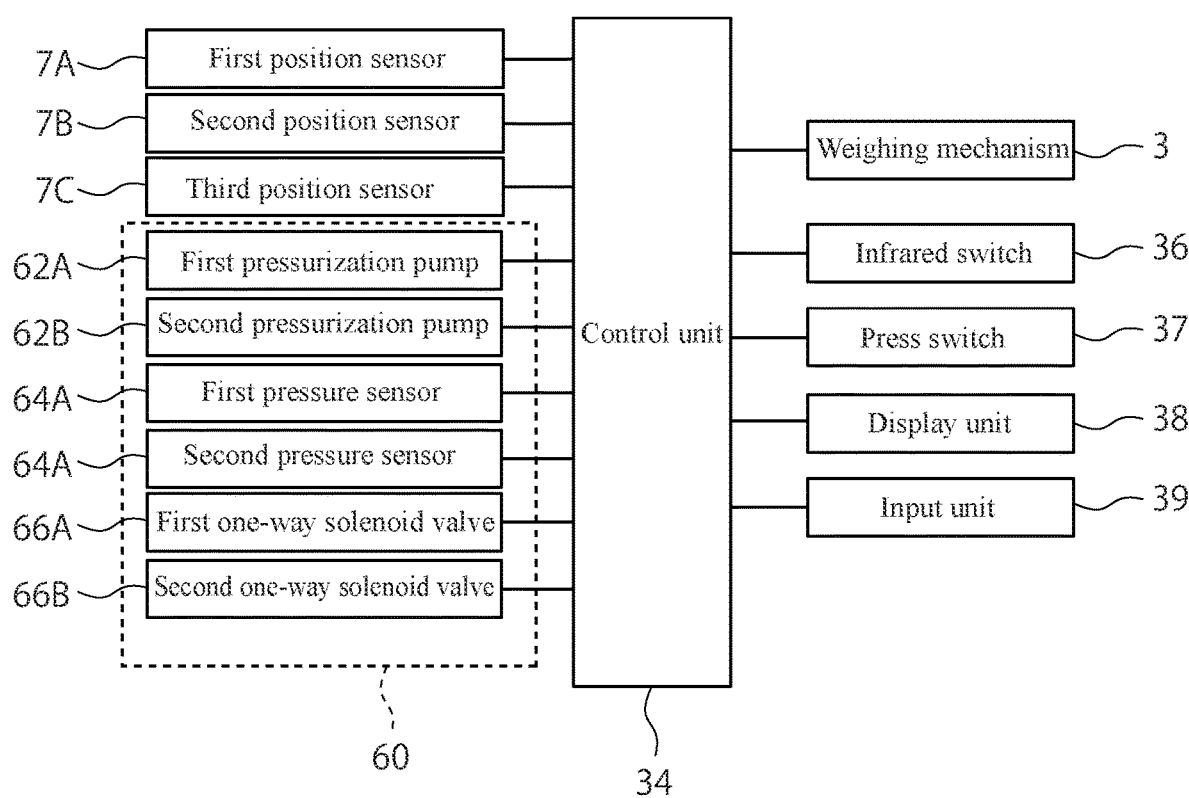
FIG. 14 is a block diagram of an electronic balance according to the second embodiment.

Next, a preferred second embodiment according to a configuration of the present disclosure will be described with reference to the drawings. FIG. 13 is a side view of a windshield 110 according to the second embodiment. A dotted line represents the door 11 being at an open position. FIG. 14 is a block diagram of an electronic balance 1 including the windshield 110. In the second embodiment, configurations equivalent to those in the first embodiment are provided with the same reference signs, and description thereof is omitted.

In an upper portion of a side surface of the case 18, three apertures 18c, 18d, and 18e are provided, and in these apertures, a first position sensor 7A, a second position sensor 7B, and a third position sensor 7C stored inside the case 18 are respectively disposed. Hereinafter, the three position sensors (7A, 7B, and 7C) are collectively referred to as position sensors 7 except in the case of designating a specific position sensor.

The position sensors 7 are reflective photointerrupters, for which a light emitting unit and a light receiving unit are provided side by side on the same surface, and when light emitted from the light emitting unit is reflected by an object, the reflected light is detected by the light receiving unit. Each position sensor 7 is disposed so that the light emitting unit and the light receiving unit are exposed from the aperture in which the position sensor is disposed, and can detect whether there is an object nearby. When the door 11 is slid, a holder upper portion 16g closes the apertures 18c, 18d, and 18e, and this is detected by the position sensors 7. The three position sensors 7 are disposed side by side away from each other in the horizontal direction, and based on whether there is detection by the position sensors 7, a position of the door 11 is determined. The position sensors 7 respond even to a transparent member, so that the positions of the apertures are not limited to the upper portion of the side surface of the case 18, and the apertures may be disposed at any positions in the up-down direction of the case 18.

In the windshield 110 according to the second embodiment, the stopper 51 is not provided, however, the second position sensor 7B is disposed instead at a half-open position, and a half-opening mechanism is implemented, which is configured to stop/move the door 11 at the half-open position by detection of the second position sensor 7B.

As illustrated in FIG. 14, the three position sensors 7 are connected to the control unit 34, and detection results of the three position sensors 7 are respectively transmitted to the control unit 34. The control unit 34 determines a position and movement of the door 11 from signals of the position sensors 7 as to which position sensor 7 is responding or has switched etc., and generates various commands to the opening and closing mechanism 60.

(Position Sensors)

A relationship between responses of the position sensors 7 and positions and movements of the door 11 will be described in detail with reference to the drawings. FIGS. 15A-15C are outline views illustrating positions of the door 11 and responses of the position sensors 7. Description is given by defining a state where the position sensor 7 detects the door 11 as ON, and a state where the position sensor 7 does not detect the door 11 as OFF. In FIGS. 15A-15C, a rectangle A represents the first position sensor 7A, a rectangle B represents the second position sensor 7B, and a rectangle C represents the third position sensor 7C (the same applies to FIGS. 16A-C to 19A-C described later).

The first position sensor 7A is a sensor to detect a fully closed state of the door 11, and is disposed at a position where the first position sensor does not detect the door 11 when the door 11 is fully closed, and detects the door 11 when the door 11 is slightly opened. Therefore, when the door 11 is at the fully closed position, the first position sensor 7A is OFF (refer to FIG. 15(A)). When all position sensors (7A, 7B, and 7C) are OFF, the door 11 is determined to be at the fully closed position. When the door 11 is slightly opened from the fully closed state, the first position sensor 7A goes ON.

The second position sensor 7B is a sensor to detect a half-opened state of the door 11, and is disposed at a position where the second position sensor detects the door 11 when the door 11 is half-opened. Therefore, when the door 11 is at a half-open position, the second position sensor 7B is ON (refer to FIG. 15(B)). When the door 11 is slightly closed from the half-open position, the second position sensor 7B goes OFF.

The third position sensor 7C is a sensor to detect a fully opened state of the door 11, and is disposed at a position where the third position sensor detects the door 11 when the door 11 is fully opened. Therefore, when the door 11 is in a fully opened state, the third position sensor 7C is ON (refer to FIG. 15(C)). When all position sensors (7A, 7B, and 7C) are ON, the door 11 is determined to be in a fully opened state. When the door 11 is slightly closed from the fully opened state, the third position sensor 7C goes OFF.

In the first embodiment, movement of the door 11 is grasped by the two pressure sensors (64A and 64B). In the second embodiment, the pressure sensors (64A and 64B) only monitor air pressures discharged by the pressurization pumps, and do not monitor movement of the door 11, and movement of the door 11 is monitored by the position sensors 7. By using the position sensors 7, a drive source of the door 11 is not limited to an air cylinder, and it is possible that, for example, a motor is used as the drive source and other various drive sources such as a rack-and-pinion and rubber pulley, etc., are used to perform the assist mode AM.

(Door and Sensors when Assist Mode AM is Valid)

Next, movements of the door 11 and responses of the position sensors 7 when the assist function is valid will be described in detail. FIGS. 16A-C to 19A-C illustrate responses of the position sensors 7 when the door 11 moves. FIG. 20 is an operation chart of the respective components in the second embodiment. A block diagram of the opening and closing mechanism 60 in the second embodiment is the same as that of the opening and closing mechanism (FIG. 7) in the first embodiment, and description thereof is omitted.

As illustrated in FIG. 20, in the second embodiment, movement of the door 11 is monitored by the position sensors 7, so that when the assist mode AM is valid, it is not necessary to monitor the air pressure, and the one-way solenoid valves (66A and 66B) are open. The assist mode AM can be switched between valid and invalid by the input unit 39.

When the assist mode AM is invalid, automatic opening/closing operations are performed by configurations equivalent to those of the first embodiment. Therefore, descriptions thereof are omitted.

In the "standard state" where the assist mode AM is invalid, the one-way solenoid valves (66A and 66B) are opened, and the pressurization pumps (62A and 62B) are not operating. The door 11 can be manually opened and closed, and when an opening/closing command is additionally input from the push switch 37 or the infrared switch 36, the door 11 is automatically opened/closed. Switching a setting between automatic opening/closing and manual opening/closing is unnecessary. While the door 11 is manually openable and closable, the door 11 can also be automatically opened and closed in response to a switch input, and after the door 11 is automatically opened or closed, manual opening and closing become possible immediately without any special operation.

When the assist mode AM is valid, the one-way solenoid valves (66A and 66B) are opened, the pressurization pumps (62A and 62B) are not operating, and movements of the door 11 are monitored by the position sensors 7. When an operator manually slightly opens or closes the door 11 being in a stationary state, this operation is detected by the position sensors 7, and thereafter the door 11 is automatically opened or closed. The configuration is made so that automatic opening and closing in response to a switch input are also possible even while the assist mode AM is valid, and when a command is input from the push switch 37 or the infrared switch 36, the door 11 is automatically opened or closed.

Operations of the door 11 and the position sensors 7 when the assist mode AM is valid will be described in detail.

A case where an operator is trying to fully open the door 11 being in a fully closed state (the half-opening function is OFF) will be described with reference to FIG. 16. In the fully closed state of the door 11, all of the three position sensors (7A, 7B, and 7C) are OFF (refer to FIG. 16(A)). When the door 11 slightly moves and the first position sensor 7A switches from OFF to ON, the control unit 34 determines that "the door 11 is about to be opened" and to assist this, performs an automatic opening operation (refer to FIG. 16(B)). When the door 11 goes into a fully opened state and the third position sensor 7C switches from OFF to ON, the control unit 34 determines that "the door 11 has moved to an open position" and stops the automatic opening operation (refer to FIG. 16(C)).

A case where an operator is trying to close the door 11 being in a fully opened state (the half-opening function is OFF) will be described with reference to FIGS. 17A-C. In a fully opened state of the door 11, all of the three position sensors (7A, 7B, and 7C) are ON (refer to FIG. 17(A)). When the door 11 slightly moves in a closing direction and the third position sensor 7C switches from ON to OFF, the control unit 34 determines that "the door 11 is about to be closed" and to assist this, performs an automatic closing operation (refer to FIG. 17(B)). When the door 11 goes into a fully closed state and the first position sensor 7A switches from ON to OFF, the control unit 34 determines that "the door 11 has moved to the closed position" and stops the automatic closing operation (refer to FIG. 17(C)).

A case where an operator is trying to half-open the door 11 being in a fully-closed state (the half-opening function is ON) will be described with reference to FIGS. 18A-C. In a fully closed state of the door 11, all of the three position sensors (7A, 7B, and 7C) are OFF (refer to FIG. 18(A)). When the door 11 slightly moves and the first position sensor 7A switches from OFF to ON, the control unit 34 determines that "the door 11 is about to be opened" and to assist this, performs an automatic opening operation (refer to FIG. 18(B)). When the door 11 goes into a half-opened state and the second position sensor 7B switches from OFF to ON, the control unit 34 determines that "the door 11 has moved to an open position" and stops the automatic opening operation (refer to FIG. 18(C)).

A case where an operator is trying to close the door 11 being in a half-opened state (the half-opening function is ON) will be described with reference to FIGS. 19A-C. In a half-opened state of the door 11, the first position sensor 7A and the second position sensor 7B are ON, and the third position sensor 7C is OFF (refer to FIG. 19(A)). When the door 11 slightly moves in a closing direction and the second position sensor 7B switches from ON to OFF, the control unit 34 determines that "the door 11 is about to be closed" and to assist this, performs an automatic closing operation (refer to FIG. 19(B)). When the door 11 goes into a fully closed state and the first position sensor 7A switches from ON to OFF, the control unit 34 determines that "the door has moved to the closed position" and stops the automatic closing operation (refer to FIG. 19(C)).

When the half-opening function is invalid, the door 11 fully opens and closes, so that opening and closing of the door 11 are determined based on ON/OFF switching of the third position sensor 7C. When the half-opening function is valid, the door 11 half-opens and closes, so that opening and closing of the door 11 are determined based on ON/OFF switching of the second position sensor 7B. Just the position sensor as a trigger differs, and in each case, the automatic opening operation and the automatic closing operation are activated equivalently.

In the present embodiment, a total of three position sensors 7 including two disposed at fully opened and closed positions, and one disposed at an intermediate position for providing the half-opening function, are used, however, the configuration may be made so that the opening degree of the door 11 can be selected by increasing the number of position sensors 7. It is also possible to grasp a detailed position and moving direction of the door 11 by using a distance sensor in order to perform the assist mode AM. A configuration is also possible in which only the first position sensor 7A and the third position sensor 7C are disposed, with no half-opening function provided, for the door 11 to be only fully automatically opened and closed.

Flowchart of Second Embodiment

Next, flows of opening and closing operations of the door 11 in the second embodiment will be described with reference to the flowcharts of FIGS. 21 and 22.

Figure 21:
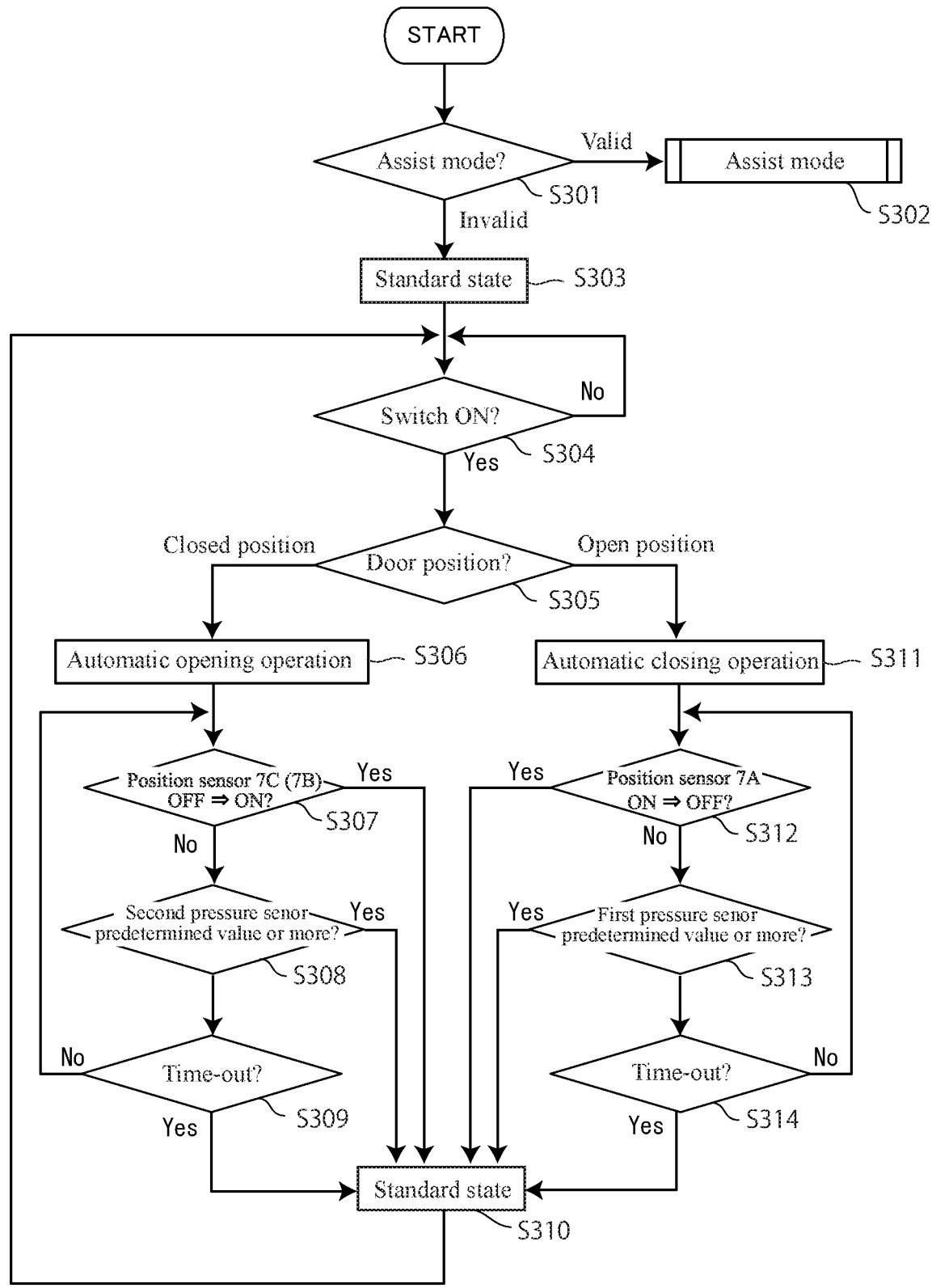
FIG. 21 is a flowchart of door opening and closing operations according to the second embodiment.

As illustrated in FIG. 21, first, in Step S301, whether the assist mode AM is valid/invalid is checked. When it is valid, the assist mode AM is entered (Step S302). The case where the assist mode AM is valid will described later, and the case where the assist mode AM is invalid (Steps S303 to S314) will be described first.

When the assist mode AM is invalid, the process shifts to Step S303, and the opening and closing mechanism 60 enters the standard state. Specifically, the first pressurization pump 62A and the second pressurization pump 62B do not operate, and the first one-way solenoid valve 66A and the second one-way solenoid valve 66B are opened (refer to FIG. 20).

Next, in Step S304, a command signal to open or close the door 11 is input from the infrared switch 36 or the push switch 37 serving as a switch to open and close the door 11. When the signal is not input, the mechanism waits until the signal is input.

When a command is input, the process shifts to Step S305, and whether the door is positioned at a closed position or at an open position is checked. Based on the detection content of the position sensors 7, an opening degree of the door 11, such as a fully closed state, a fully opened state, a half-opened state, or the like is checked (refer to FIGS. 16 to 19). As in the first embodiment, to secure manual movements of the door 11 and erroneous determination of the control unit 34, a fully closed state corresponds to the closed position, and other states correspond to open positions.

First, a case where the door 11 is at the closed position (Steps S306 to S310) will be described.

When the door 11 is at the closed position, the process shifts to Step S306, and in order to open the door 11 being at the closed position, an "automatic opening operation" for the door 11 is performed. In detail, the second one-way solenoid valve 66B is closed, and pressurization of the second pressurization pump 62B is started. At this time, the first one-way solenoid valve 66A is left open, and the first pressurization pump 62A is not activated (refer to FIGS. 7 and 20).

Next, in Step S307, whether the door 11 has opened is determined depending on whether, when the half-opening function is invalid, the third position sensor 7C, and when the half-opening function is valid, the second position sensor 7B, has switched from OFF to ON.

When the third position sensor 7C (the second position sensor 7B when the half-opening function is valid) switches to ON, it is determined that the door 11 has been opened, and the process shifts to Step S310, the operation of the second pressurization pump 62B is stopped, and the second one-way solenoid valve 66B is opened. Accordingly, the mechanism returns to the standard state, and manual opening and closing become possible.

When the door 11 has not been opened to a desired position yet, that is, the third position sensor 7C (the second position sensor 7B when the half-opening function is valid) is OFF, the process shifts to Step S308.

Next, in Step S308, whether a measurement value of the second pressure sensor 64B is a predetermined value or more is determined. When a movement of the door 11 is blocked by something unexpected such as finger pinching, the air pressure rapidly increases, and when this increase is detected by the second pressure sensor 64B, the process shifts to Step S310. The pump immediately stops and the movement of the door 11 is stopped, both one-way solenoid valves (66A and 66B) are caused to communicate with the atmosphere, and the load to the door 11 is eliminated and safety is secured. In addition, when an unexpected high air pressure is applied due to a failure or the like, an emergency stop is made. By making the configuration so that pressurization by the pump is stopped when the air pressure reaches the predetermined value or more, safety is secured. When the measurement value of the second pressure sensor 64B is less than the predetermined value, the process shifts to Step S309.

Next, in Step S309, the control unit 34 has activated an internal timer from the start of pressurization of the second pressurization pump 62B, and when the timer has timed out (exceeded a predetermined time), the process shifts to Step S310, and the mechanism returns to the standard state. When the predetermined time has not elapsed yet, the process returns to Step S307. The configuration is made so that even if the third position sensor 7C (the second position sensor 7B when the half-opening function is valid) is OFF and the measurement value of the second pressure sensor 64B is less than the predetermined value, when the predetermined time elapses, the process shifts to Step S310 and the mechanism returns to the standard state. By preparing the time-out mechanism, a configuration is provided in which forcible termination when, for example, air leakage or a failure is suspected, is avoided and the door is stopped once as error processing.

Next, a case (Steps S311 to S314) where the door 11 is at an open position in Step S305 will be described.

When the door 11 is at an open position, the process shifts to Step S311, and in order to close the door 11 being at the open position, an "automatic closing operation" for the door 11 is performed. Specifically, the first one-way solenoid valve 66A is closed, and operation of the first pressurization pump 62A is started. At this time, the second one-way solenoid valve 66B is left open, and the second pressurization pump 62B is not activated (refer to FIGS. 7 and 20).

Next, the process shifts to Step S312, and based on whether the first position sensor 7A has switched from ON to OFF, whether the door 11 has closed is checked.

When the first position sensor 7A switches to OFF, it is determined that the door 11 has been closed, and the process shifts to Step S310, the operation of the first pressurization pump 62A is stopped, and the first one-way solenoid valve 66A is opened. Accordingly, the mechanism returns to the standard state, and manual opening and closing become possible.

When the first position sensor 7A is ON, it is determined that the door 11 is not in a fully closed state yet, and the process shifts to Step S313.

In Step S313, whether a measurement value of the first pressure sensor 64A is a predetermined value or more is determined. This is a process for securing safety like Step S308. When the measurement value is the predetermined value or more, the process shifts to Step S310 and the mechanism is returned to the standard state, and when the measurement value is less than the predetermined value, the process shifts to Step S314.

In Step S314, the control unit 34 has activated an internal timer from the start of operation of the first pressurization pump 62A, and when the timer has timed out (exceeded the predetermined time), the process shifts to Step S310, and the mechanism returns to the standard state. When the predetermined time has not elapsed yet, the process returns to Step S312.

The configuration is made so that even if the value of the first pressure sensor 64A is less than the predetermined value, when the predetermined time elapses, the process shifts to Step S310 and the mechanism returns to the standard state.

The configurations and effects of Steps S313 and S314 are equivalent to those of Steps S308 and S309.

Flow when Assist Mode is Valid in Second Embodiment

Next, a flow of operation of the opening and closing mechanism 60 when the assist mode AM is valid in the second embodiment will be described.

Figure 22:
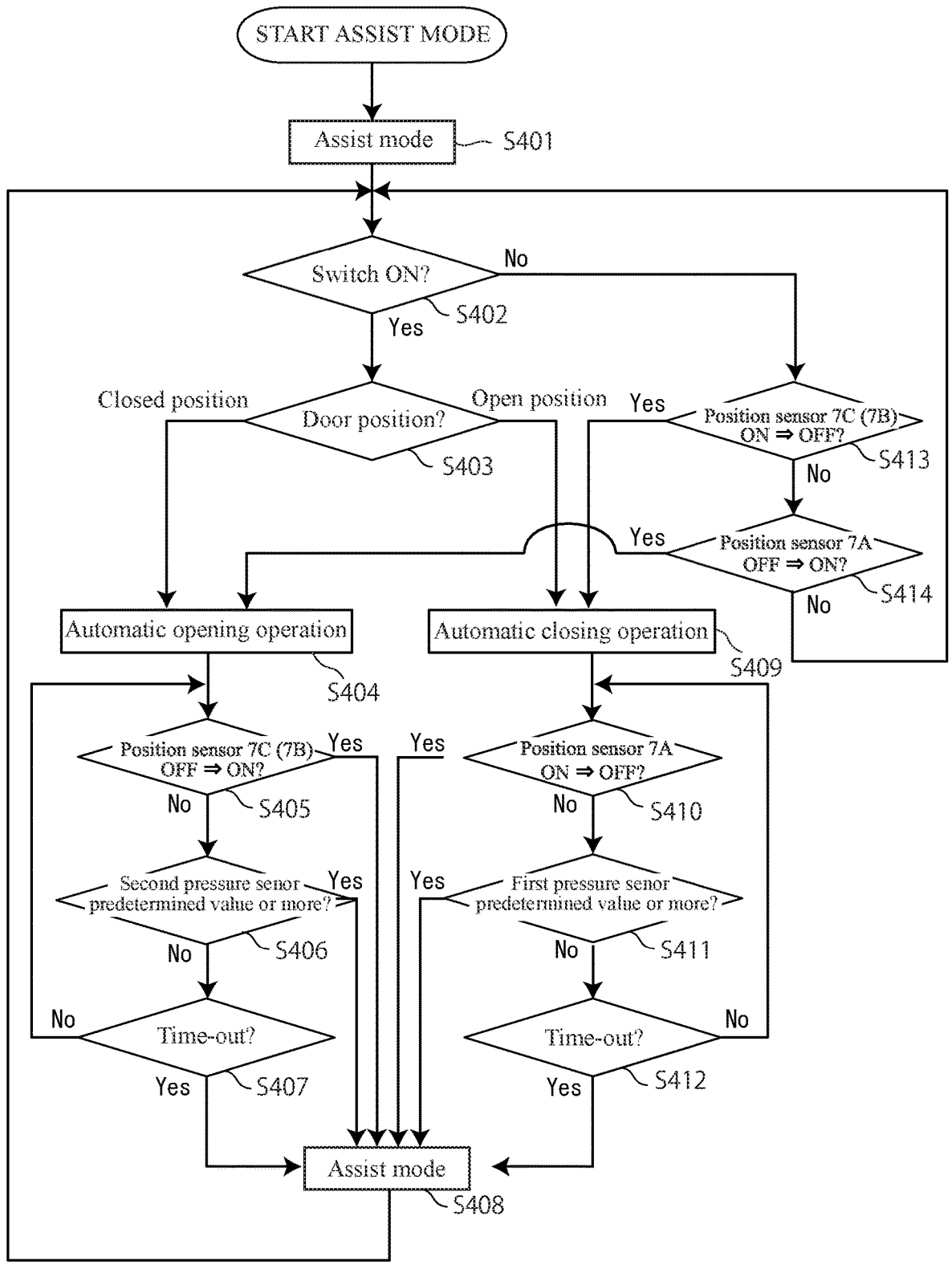
FIG. 22 is a flowchart of an assist mode according to the second embodiment.

As illustrated in FIG. 22, first, in Step S401, the standby state of the assist mode AM is entered. At this time, both one-way solenoid valves (66A and 66B) are opened, and both pressurization pumps (62A and 62B) do not operate (refer to FIG. 20).

Next, the process shifts to Step S402, and when a command is input from the switch, the process shifts to Step S403. When no command is input from the switch, the process shifts to Step S413. The case where no command is input (Steps S413 and S414) will be described later, and the case where a command is input (Steps S403 to S412) will be described first.

Steps S403 to S412 respectively correspond to Steps S305 to S314, and are equivalently configured.

When an opening/closing command is input from the switch, the process shifts to Step S403, and whether the door 11 is positioned at a closed position or at an open position is checked. Based on the detection content of the position sensors 7, a degree of opening of the door 11, such as a fully-closed state, a fully opened state, or a half-opened state, is checked (Refer to FIGS. 16 to 19).

First, a case where the door 11 is at the closed position (Steps S404 to S408) will be described.

When the door 11 is at the closed position, the process shifts to Step S404, and in order to open the door 11 being at the closed position, an "automatic opening operation" for the door 11 is performed. Specifically, the second one-way solenoid valve 66B is closed, and pressurization of the second pressurization pump 62B is started. At this time, the first one-way solenoid valve 66A is left open, and the first pressurization pump 62A is not activated (refer to FIGS. 7 and 20).

Next, the process shifts to Step S405, and whether the door 11 has opened is determined based on whether, when the half-opening function is invalid, the third position sensor 7C, or when the half-opening function is valid, the second position sensor 7B, has switched from OFF to ON.

When the third position sensor 7C (the second position sensor 7B when the half-opening function is valid) switches to ON, it is determined that the door 11 has been opened, and the process shifts to Step S408, the operation of the second pressurization pump 62B is stopped, and the second one-way solenoid valve 66B is opened. Accordingly, the mechanism returns to the assist mode AM standby state.

When the door 11 has not been opened to a desired position yet, that is, when the third position sensor 7C (the second position sensor 7B when the half-opening function is valid) is OFF, the process shifts to Step S406.

Next, in Step S406, whether a measurement value of the second pressure sensor 64B is a predetermined value or more is determined. When a movement of the door 11 is blocked by something unexpected such as finger pinching, the air pressure rapidly increases, and when this increase is detected by the second pressure sensor 64B, the process shifts to Step S408. The pump immediately stops and the movement of the door 11 is stopped, both one-way solenoid valves (66A and 66B) are caused to communicate with the atmosphere, and the load to the door 11 is eliminated and safety is secured. In addition, when an unexpected high air pressure is applied due to a failure or the like, an emergency stop is made. By making the configuration so that pressurization by the pump is stopped when the air pressure reaches the predetermined value or more, safety is secured. When the measurement value of the second pressure sensor 64B is less than the predetermined value, the process shifts to Step S407.

Next, in Step S407, the control unit 34 has activated an internal timer from the start of pressurization of the second pressurization pump 62B, and when the timer has timed out (exceeded the predetermined time), the process shifts to Step S408, and the mechanism returns to the assist mode AM standby state. When the predetermined time has not elapsed yet, the process returns to Step S405. The configuration is made so that even if the third position sensor 7C (the second position sensor 7B when the half-opening function is valid) is OFF and the measurement value of the second pressure sensor 64B is less than the predetermined value, when the predetermined time elapses, the process shifts to Step S408, the second pressurization pump 62B is stopped, and the second one-way solenoid valve 66B is opened. By preparing the time-out mechanism, a configuration is provided in which forcible termination when, for example, air leakage or a failure is suspected, is avoided and the door is stopped once as error processing.

Next, a case (Steps S409 to S412) where the door 11 is at an open position in Step S403 will be described.

When the door 11 is at an open position, the process shifts to Step S409, and to close the door 11 being at the open position, an "automatic closing operation" for the door 11 is performed. Specifically, the first one-way solenoid valve 66A is closed, and operation of the first pressurization pump 62A is started. At this time, the second one-way solenoid valve 66B is left open, and the second pressurization pump 62B is not activated (refer to FIGS. 7 and 20).

Next, the process shifts to Step S410, and whether the door 11 has closed is checked based on whether the first position sensor 7A has switched from ON to OFF.

When the first position sensor 7A switches to OFF, it is determined that the door 11 has been closed, and the process shifts to Step S408, the operation of the first pressurization pump 62A is stopped, and the first one-way solenoid valve 66A is opened. Accordingly, the mechanism returns to the standard state, and manual opening and closing become possible.

When the first position sensor 7A is ON, it is determined that the door 11 is not in a fully closed state yet, and the process shifts to Step S411.

In Step S411, whether a measurement value of the first pressure sensor 64A is a predetermined value or more is determined. This is a process for securing safety like Step S406. When the measurement value is the predetermined value or more, the process shifts to Step S408, the first pressurization pump 62A is stopped, the first one-way solenoid valve 66A is opened, and the mechanism returns to the assist mode AM standby state.

When the measurement value of the first pressure sensor 64A is less than the predetermined value, the process shifts to Step S412. In Step S412, the control unit 34 has activated an internal timer from the start of operation of the first pressurization pump 62A, and when this timer has timed out (exceeded the predetermined time), the process shifts to Step S408. When the predetermined time has not elapsed yet, the process returns to Step S410.

The configuration is made so that even if the value of the first pressure sensor 64A is less than the predetermined value, when the predetermined time elapses, the process shifts to Step S408, the first pressurization pump 62A is stopped, the first one-way solenoid valve 66A is opened, and the mechanism returns to the assist mode AM standby state.

The configurations and effects of Steps S411 and S412 are equivalent to those of Steps S406 and S407.

Next, a case where no command has been input from the switch in Step S402 and the process has shifted to Step S413 will be described.

In Step S413, whether the third position sensor 7C or the second position sensor 7B has switched from ON to OFF is determined. Accordingly, whether an operator is trying to close the door 11 being at the open position is checked. When the third position sensor 7C or the second position sensor 7B switches from ON to OFF, it is determined that "the door 11 is about to be closed," and to assist this, the process shifts to Step S409, and an automatic closing operation is performed. In other cases, the process shifts to Step S414.

Next, in Step S414, whether the first position sensor 7A has switched from OFF to ON is determined. Accordingly, whether an operator is trying to open the door 11 being at the closed position is checked. When the first position sensor 7A switches from OFF to ON, it is determined that "the door 11 is about to be opened," and to assist this, the process shifts to Step S404 and an automatic opening operation is performed. In other cases, the process returns to Step S402.

With this configuration, the assist mode AM is implemented in the windshield 110 by using the position sensors 7.

Modifications

Preferred embodiments of the present invention have been described above, however, the present invention is not limited to the configurations described above. For example, a setting may be provided in which an input from the infrared switch 36 that is a non-contact switch and is hence easily erroneously activated may be rejected when the assist mode AM is valid.

In the assist mode AM, an opening/closing operation of the door 11 by an operator is detected and assisted, and in other words, a movement of the door 11 from a stationary state is detected, and by using this as a switch, the control unit 34 controls the opening and closing mechanism 60 so as to automatically open/close the door 11. A manual mode may be equipped in which whether to accept or reject the infrared switch 36, the push switch 37, or a switch (assist mode AM) by the door 11 can be freely set according to an operator's wish.

Embodiments and modifications of the present invention have been described above, and the embodiments and modifications can be combined based on knowledge of a person skilled in the art, and such a combined embodiment is included in the scope of the present invention.

REFERENCE SIGNS LIST

7 Position sensor
10 Windshield
11 Door
30 Balance main body
34 Control unit
40 Air cylinder
50 Half-opening mechanism
51 Stopper
62A, 62B Pressurization pump
64A, 64B Pressure sensor
66A, 66B One-way solenoid valve
S Weighing chamber

The invention claimed is:

1. A windshield for a balance to be attached to a balance to define a weighing chamber, comprising:
    an openable and closable door constituting a portion of the weighing chamber;
    an opening and closing mechanism configured to open and close the door;
    a sensor configured to detect movement of the door; and
    a control unit configured to perform control so as to cause the opening and closing mechanism to open or close the door when a movement of the door from a stationary state is detected by the sensor,
    wherein moving the door from a stationary state triggers the control unit to cause the opening and closing mechanism to open or close the door.

2. The windshield for a balance according to claim 1, wherein the sensor is configured to detect a moving direction of the door, and the control unit is configured to perform control so as to cause the opening and closing mechanism to open the door when the door is moved in an opening direction, and perform control so as to cause the opening and closing mechanism to close the door when the door is moved in a closing direction.

3. The windshield for a balance according to claim 1, wherein the opening and closing mechanism includes, as a drive source to drive the door, an air cylinder to be joined to the door, the sensor is a pressure sensor configured to measure an air pressure of the air cylinder, and the movement of the door is detected based on a change in the air pressure measured by the pressure sensor.

4. The windshield for a balance according to claim 2, wherein the opening and closing mechanism includes, as a drive source to drive the door, an air cylinder to be joined to the door, the sensor is a pressure sensor configured to measure an air pressure of the air cylinder, and the movement of the door is detected based on a change in the air pressure measured by the pressure sensor.

5. The windshield for a balance according to claim 1, wherein the sensor is configured to be light sensors to be disposed respectively at an open position and a closed position of the door.

6. The windshield for a balance according to claim 2, wherein the sensor is configured to be light sensors to be disposed respectively at an open position and a closed position of the door.

7. The windshield for a balance according to claim 1, comprising: a half-opening mechanism configured to stop the door at a half-open position, and a movement of the door is configured to be switchable to full-opening/closing or half-opening/closing.

8. The windshield for a balance according to claim 2, comprising: a half-opening mechanism configured to stop the door at a half-open position, and a movement of the door is configured to be switchable to full-opening/closing or half-opening/closing.

9. The windshield for a balance according to claim 3, comprising: a half-opening mechanism configured to stop the door at a half-open position, and a movement of the door is configured to be switchable to full-opening/closing or half-opening/closing.

10. The windshield for a balance according to claim 4, comprising: a half-opening mechanism configured to stop the door at a half-open position, and a movement of the door is configured to be switchable to full-opening/closing or half-opening/closing.

11. The windshield for a balance according to claim 5, comprising: a half-opening mechanism configured to stop the door at a half-open position, and a movement of the door is configured to be switchable to full-opening/closing or half-opening/closing.

12. The windshield for a balance according to claim 6, comprising: a half-opening mechanism configured to stop the door at a half-open position, and a movement of the door is configured to be switchable to full-opening/closing or half-opening/closing.

13. A method of opening and closing a windshield for a balance to be attached to a balance to define a weighing chamber, wherein the windshield comprises an openable and closable door constituting a portion of the weighing chamber; an opening and closing mechanism configured to open and close the door; a sensor configured to detect movement of the door; and a control unit configured to perform control so as to cause the opening and closing mechanism to open or close the door when a movement of the door from a stationary state is detected by the sensor, wherein the application of a force to move the door from a stationary state triggers the control unit to cause the opening and closing mechanism to open or close the door, comprising the step of
    applying a force to the door in either an opening or closing direction to trigger the control unit to cause the opening and closing mechanism to open or close the door.

* * * * *